United States Patent
Cheng et al.

(10) Patent No.: US 11,776,215 B1
(45) Date of Patent: Oct. 3, 2023

(54) PRE-LABELING DATA WITH CUBOID ANNOTATIONS

(71) Applicant: Scale AI, Inc., San Francisco, CA (US)

(72) Inventors: Chiao-Lun Cheng, San Francisco, CA (US); Elliot Branson, San Francisco, CA (US); Leigh Marie Braswell, San Francisco, CA (US); Daniel Havíř, San Francisco, CA (US); Jeffrey Alan Anders, Denver, CO (US)

(73) Assignee: SCALE AI, INC., San Francisco, CA (US)

( * ) Notice: Subject to any disclaimer, the term of this patent is extended or adjusted under 35 U.S.C. 154(b) by 28 days.

(21) Appl. No.: 16/716,396

(22) Filed: Dec. 16, 2019

(51) Int. Cl.
*G06T 19/00* (2011.01)
*G06F 3/0482* (2013.01)
*G06F 3/04847* (2022.01)
*G06T 7/60* (2017.01)
*G06N 5/04* (2023.01)
*G06N 20/00* (2019.01)

(52) U.S. Cl.
CPC .............. *G06T 19/00* (2013.01); *G06F 3/0482* (2013.01); *G06F 3/04847* (2013.01); *G06N 5/04* (2013.01); *G06N 20/00* (2019.01); *G06T 7/60* (2013.01); *G06T 2200/24* (2013.01); *G06T 2207/10028* (2013.01); *G06T 2207/20081* (2013.01); *G06T 2219/004* (2013.01)

(58) Field of Classification Search
CPC .......... G06T 19/00; G06N 5/04; G06F 3/0482; G06F 3/04847; G06T 7/60; G06N 20/00; G06T 2207/20081; G06T 2219/004; G06T 2207/10028; G06T 2200/24
See application file for complete search history.

(56) References Cited

U.S. PATENT DOCUMENTS

| | | | | |
|---|---|---|---|---|
| 10,169,678 | B1* | 1/2019 | Sachdeva et al. | G06T 15/205 |
| 10,936,902 | B1* | 3/2021 | Bagwell et al. | G06T 17/00 |
| 11,010,907 | B1* | 5/2021 | Bagwell | G06V 20/56 |
| 2008/0273752 | A1* | 11/2008 | Zhu et al. | G08G 1/167 382/103 |
| 2013/0346409 | A1* | 12/2013 | Welinder et al. | G06N 20/00 707/737 |
| 2018/0137642 | A1* | 5/2018 | Malisiewicz et al. | G06K 9/00201 |
| 2018/0189604 | A1* | 7/2018 | Zhang et al. | G06K 9/469 |
| 2018/0373980 | A1* | 12/2018 | Huval | G06F 18/41 |
| 2019/0130188 | A1* | 5/2019 | Zhou et al. | G06T 7/248 |
| 2019/0362186 | A1* | 11/2019 | Irshad et al. | G08G 1/04 |

(Continued)

*Primary Examiner* — Michael Le
(74) *Attorney, Agent, or Firm* — Artegis Law Group, LLP

(57) ABSTRACT

One embodiment provides techniques for automatically pre-labeling point cloud data with cuboid annotations. Point cloud data is processed using ML models to detect, associate, and localize objects therein, in order to generate cuboid tracks that each include a series of cuboid annotations associated with an object. An object detection model that detects objects and performs coarse localization is trained using a loss function that separately evaluates the distances between corners of predicted cuboids and corners of ground truth cuboids for position, size, and yaw. A refinement model that performs more accurate localization takes as input 2D projections of regions surrounding cuboid tracks predicted by the object detection model and the cuboid tracks, and outputs refined cuboid tracks. The refined cuboid tracks are filtered to a set of keyframes, with in-between frames being interpolated. The cuboid tracks can then be presented to a user for viewing and editing.

17 Claims, 13 Drawing Sheets
(3 of 13 Drawing Sheet(s) Filed in Color)

(56) References Cited

U.S. PATENT DOCUMENTS

| | | | | |
|---|---|---|---|---|
| 2019/0370606 A1* | 12/2019 | Kehl et al. | ............. | G06V 10/82 |
| 2020/0081095 A1* | 3/2020 | Lin | ........................ | G06T 7/60 |
| 2020/0082614 A1* | 3/2020 | Xu et al. | ............... | G01S 13/89 |
| 2020/0160033 A1* | 5/2020 | Kehl et al. | ................ | G06T 7/73 |
| 2020/0175286 A1* | 6/2020 | Major et al. | ........... | G06V 10/82 |
| 2020/0202615 A1* | 6/2020 | Kwon et al. | ........... | G06T 17/00 |
| 2020/0272854 A1* | 8/2020 | Caesar | .................. | G06N 3/045 |
| 2021/0042530 A1* | 2/2021 | Kim et al. | ............ | G06F 18/214 |
| 2021/0043002 A1* | 2/2021 | Zeng | ................. | G06K 9/00664 |
| 2021/0073977 A1* | 3/2021 | Carter et al. | ........... | G06T 11/20 |

\* cited by examiner

PRE-LABELING DATA WITH CUBOID ANNOTATIONS

BACKGROUND

Technical Field

Embodiments of the present disclosure relate generally to machine learning and, more specifically, to pre-labeling data with cuboid annotations.

Description of the Related Art

Advances in the field of machine learning and increases in available computing power have led to a proliferation in the applications of machine learning. Many machine learning models, including deep neural networks, require large amounts of labeled data to train and verify. Such labeled data typically includes samples that have been tagged with labels, which are also referred to herein as "annotations." For example, labeled LIDAR (light detection and ranging) data including annotations of cuboids that bound objects in the LIDAR data may be used to train a machine learning model to predict such cuboids for additional LIDAR data.

Labeled data can be obtained by relying on human judgment to tag data with appropriate labels. However, such manual labeling of data is time consuming and labor intensive, and few traditional tools exist to facilitate the process of labeling data for machine learning.

As the foregoing illustrates, what is needed in the art are techniques to facilitate data labeling for machine learning.

SUMMARY

One embodiment provides a computer-implemented method for annotating point cloud data. The method includes processing point cloud data using at least one machine learning (ML) model to generate annotations of objects in the point cloud data. The method further includes causing to be displayed at least one of the annotations and at least one user interface element that permits a user to select, confirm, or modify the at least one of the annotations that is displayed.

Another embodiment provides a computer-implemented method for labeling data. The method includes processing data using at least one machine learning (ML) model to generate annotations of objects in the data. The method further includes determining, based on a user-specified threshold, one or more of the annotations. In addition, the method includes causing to be displayed the one or more annotations and at least one user interface element that permits a user to select, confirm, or modify the at least one of the annotations that is displayed.

Yet another embodiment provides a computer-implemented method for training a ML model. The method includes receiving training data that includes point cloud data and labeled cuboids bounding objects in the point cloud data. The method further includes training a ML model using a loss function evaluated by performing steps including: predicting, using the ML model, a first cuboid annotation; determining a first distance between corners of one of the labeled cuboids included in the training data and a second cuboid annotation that includes a size of the first cuboid annotation, a position of the one of the labeled cuboids, and a yaw of the one of the labeled cuboids; determining a second distance between corners of the one of the labeled cuboids and a third cuboid annotation that includes a position of the first cuboid annotation, a size of the one of the labeled cuboids, and a yaw of the one of the labeled cuboids; determining a third distance between corners of the one of the labeled cuboids and a fourth cuboid annotation that includes a yaw of the first cuboid annotation, a size of the one of the labeled cuboids, and a position of the one of the labeled cuboids; and determining an average of the first distance, the second distance, and the third distance.

Further embodiments include non-transitory computer-readable storage media storing instructions that, when executed by a computer system, cause the computer system to perform the methods set forth above, and computer systems programmed to carry out the methods set forth above.

One advantage of the disclosed techniques is that cuboid annotations are automatically generated from point cloud data and presented to users, who can select which cuboid annotations to use and make modifications, selections, and/or confirmations of those cuboid annotations. Doing so facilitates user labeling of point cloud data with cuboid annotations. In particular, pre-labeled cuboid annotations generated via techniques disclosed herein can reduce user labeling time, rather than increasing labeling time by requiring the users to correct inaccurate pre-labeled annotations. The ML models disclosed herein utilize contextual information from past and future frames of each video frame to more accurately predict cuboid annotations. Further, a multi-task loss function is disclosed that enables relatively fast training of a ML model for objection detection, and the trained object-detection model can be more accurate than models trained using other loss functions. In addition, UIs are disclosed that permit users to view and modify pre-labeled cuboid annotations intuitively and efficiently. These technical advantages represent one or more technological advancements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments. The patent or application file contains at least one drawing executed in color. Copies of this patent or patent application publication with color drawing(s) will be provided by the Office upon request and with payment of the necessary fee.

DETAILED DESCRIPTION

In the following description, numerous specific details are set forth to provide a more thorough understanding of the present disclosure. However, it will be apparent to one of skilled in the art that the present disclosure may be practiced without one or more of these specific details.

System Overview

Figure 1:
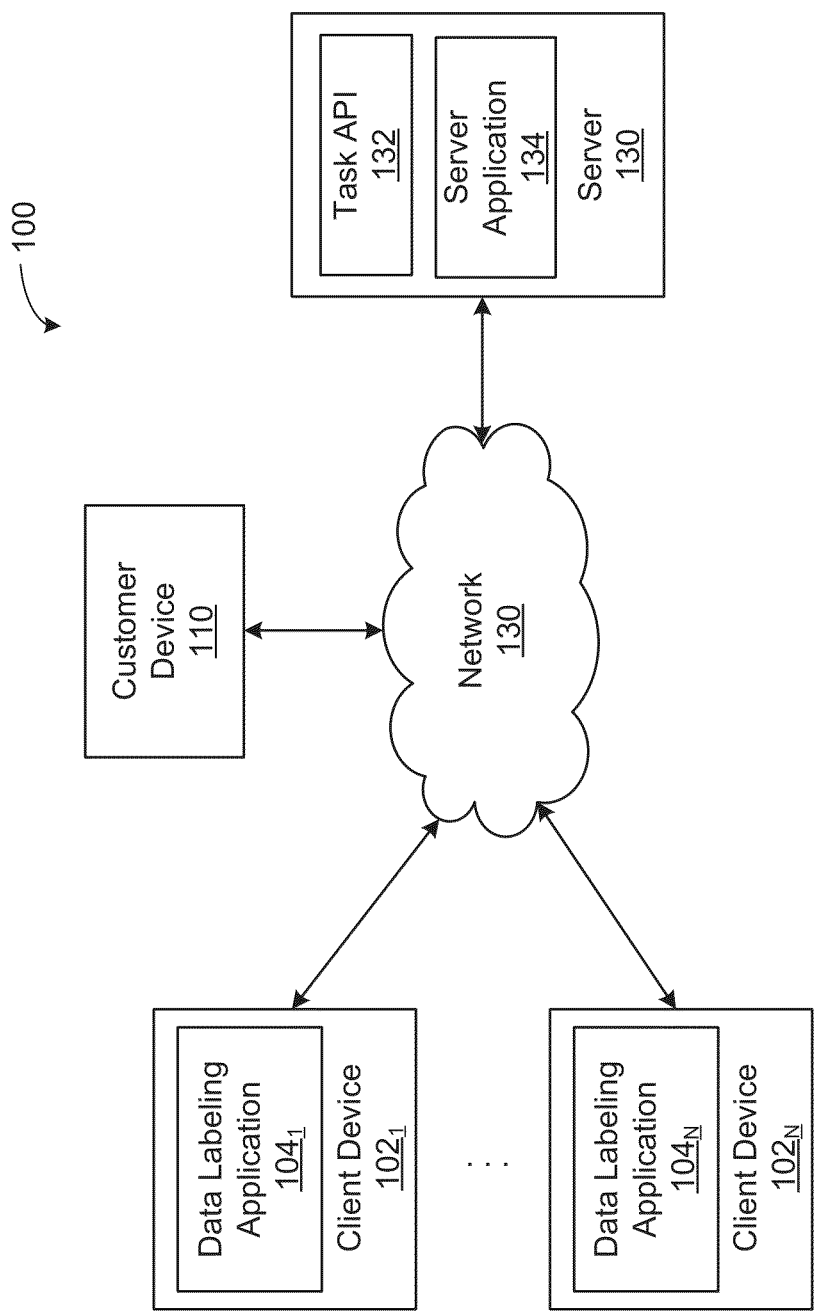
FIG. 1 is a conceptual illustration of a system configured to implement one or more embodiments.

FIG. 1 is a conceptual illustration of a system 100 configured to implement one or more embodiments. As shown, the system 100 includes, without limitation, a server computing device 130 and a number of client devices $102_{1-N}$, each of which is referred to individually herein as a client device 102, that interoperate to facilitate data labeling by users of the client devices $102_{1-N}$, in response to a customer request. The server 130, the client devices $102_{1-N}$, and a customer device 110 communicate via a network 130, which may be a wide area network (WAN) such as the Internet, a local area network (LAN), or any other suitable network. Although a single server 130 and customer device 110 are shown for illustrative purposes, the system 100 may generally include any number of servers, customer devices, and client devices, each of which may be a physical computing system or a virtual computing system running in, e.g., a data center or cloud.

Illustratively, the server 130 exposes a task application programming interface (API) 132 that allows customers to send data, and data labeling requests, via API calls. Any suitable data and labeling requests may be transmitted via such API calls to the server 130. For example, in the context of autonomous vehicles, photographic, LIDAR (light detection and ranging), and/or radar (radio detection and ranging) data captured by vehicle-mounted sensors may be uploaded from the customer device 110 to the server 130, along with a request that particular types of objects (e.g., vehicles, bicycles, pedestrians, etc.) be tagged in such data. GPS (global positioning system) data may also be uploaded and is typically included in LIDAR data.

In some embodiments, the server application 134 may require the data and data labeling requests submitted via API calls to satisfy predefined restrictions. For example, restrictions may exist on which classes (e.g., vehicles, pedestrians, buildings, etc.) of objects can be labeled, the format and size of the data, etc.

The server application 134 processes data received via the task API 132 and sends the processed data to data labeling applications $104_{1-N}$ running in the client devices $102_{1-N}$, along with indications of data labeling tasks to be performed by users of the client devices $102_{1-N}$, based on the customer's request. Any suitable processing of received data may be performed by the server application 134. For example, in some embodiments, the server application 134 could convert photographic, LIDAR, or radar data received in different formats to a single format that the data labeling applications $104_{1-N}$ can read. As another example, the server application 134 could compress the received data to a smaller size. Although the server application 134 is shown as a single application for illustrative purposes, it should be understood that functionality of the server application 134 may be performed by multiple applications or other types of software in alternative embodiments.

Each of the data labeling applications $104_{1-N}$, referred to individually herein as a data labeling application 104, digests and renders data received from the server application 134 for displayed via a user interface (UI). In some embodiments, the data labeling application 104 may render one or more colored point clouds for visualizing three-dimensional (3D) data (e.g., LIDAR and/or radar data), while permitting users to navigate and view the point clouds from different perspectives. The data labeling application 104 may employ various techniques during the rendering of a point cloud. For example, in some embodiments, the data labeling application 104 may use down sampling to obtain an aggregated point cloud that includes only points conveying the most information. As another example, the data labeling application 104 could, based on a user specification, blend point cloud colorings derived from different data sources (e.g., photographic, label, and/or LIDAR intensity data). In addition to displaying rendered point clouds via a UI, the data labeling application 104 may also display photographs associated with those point clouds at the same time.

In some embodiments, the data labeling application 104 may provide tools to facilitate data labeling tasks. For example, the tools could allow a user to draw annotations in the form of cuboids, label points as belonging to particular objects, etc. using a mouse and/or keyboard. As additional examples, tools could be provided that automatically adjust the position and/or orientation of a user-designated cuboid, propagate a user-designated cuboid from a key frame to other frames, etc., thereby aiding the user in performing data labeling tasks.

Figure 2:
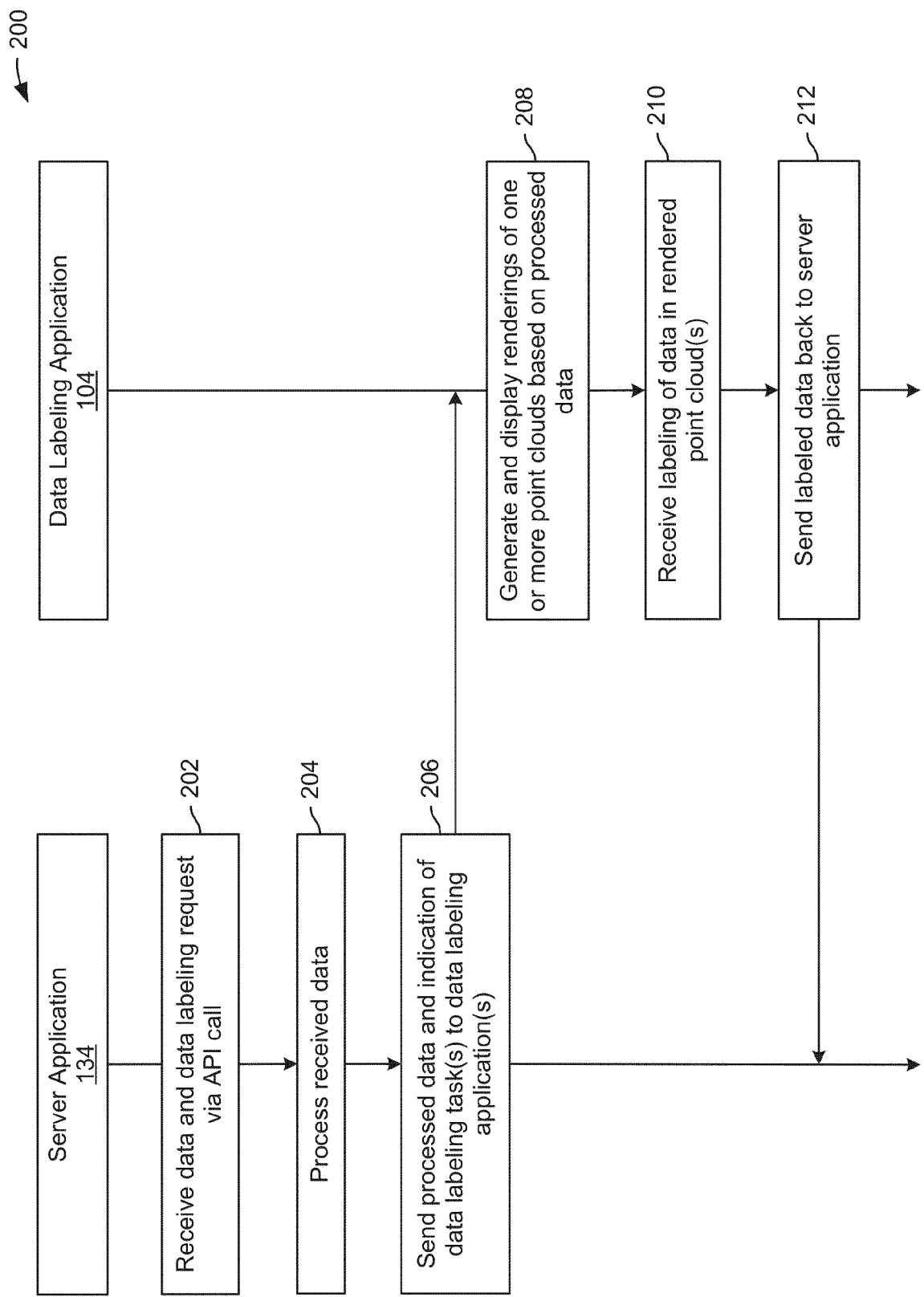
FIG. 2 is a flow diagram of method steps for processing data labeling requests, according to various embodiments.

FIG. 2 is a flow diagram of method steps for processing data labeling requests, according to various embodiments. Although the method steps are described with reference to the system of FIG. 1, persons skilled in the art will understand that any system may be configured to implement the method steps, in any order, in other embodiments.

As shown, a method 200 begins at step 202, where the server application 134 receives data and a data labeling request via an API call. The data may be in any suitable format acceptable to the server application 134. For example, the server application 134 may require data to be sent in one or more JavaScript Object Notation (JSON) files. Similarly, the data labeling request may need to satisfy certain restrictions, such as which classes (e.g., cars, pedestrians, buildings, etc.) of objects can be labeled.

At step 204, the server application 134 processes the received data. Any suitable processing may be performed by the server application 134. As described, the processing in some embodiments may include, e.g., compressing the received data and/or converting the received data into a format that can be read by data labeling application(s). For example, the received data could be converted to a data format in which points of a 3D point cloud are represented in a list as (x, y, z) coordinates with associated time stamps.

At step 206, the server application 134 sends the processed data and an indication of data labeling task(s), based on the received request, to one or more data labeling applications. Although one data labeling application 104 is shown for illustrative purposes, it should be understood that the server application 134 may send the processed data and indication of data labeling task(s), via a network, to any number of data labeling applications running on different client devices.

At step 208, a data labeling application 104 that receives the processed data generates and displays renderings of one or more point clouds based on the received data. As described, the data labeling application 104 may display the rendered point cloud(s) via a UI that permits a user to navigate and view the point cloud(s) from different perspectives. In addition, the UI may display photographs associated with the rendered point cloud(s), and the data labeling application 104 may provide tools to facilitate labeling of the rendered point cloud(s) via the UI.

At step 210, the data labeling application 104 receives labeling of data in the rendered point cloud(s). In some embodiments, a user may navigate the point cloud(s) spatially and/or temporally and then draw annotations such as cuboids, label points as belonging to particular objects, etc. For example, the user could look around a scene, identify objects of interest, use a mouse to indicate where those objects are located, use the mouse and a keyboard to precisely size cuboids around the objects, etc. In such a case, the user may further navigate forward and/or backwards in time to see where the objects move over time, and label the objects in every frame that is associated with a distinct point in time. As described, the data labeling application 104 may provide tools that enable such labeling, as well as tools that facilitate user labeling by, e.g., automatically adjusting the position and/or orientation of a user-designated cuboid, propagating a cuboid from one frame designated as a key frame to other frames, etc.

At step 212, the data labeling application 104 sends the labeled data back to the server application 134. The labeled data may be sent to the server application 134 via a network, such as the Internet, and the server application 134 may then return the labeled data to the customer. In some embodiments, optional verification and/or other processing may be performed prior to returning labeled data to the customer.

Figure 3:
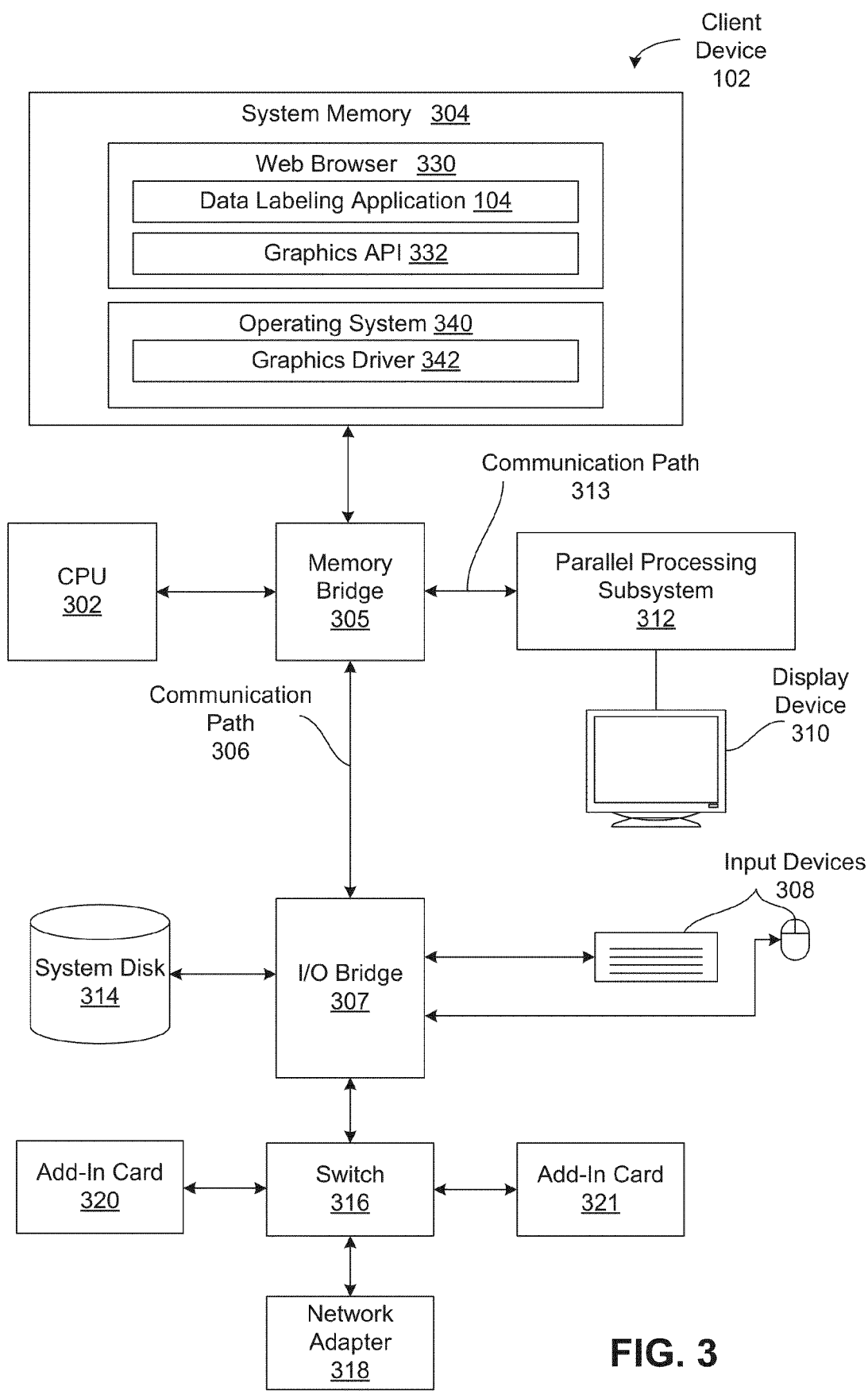
FIG. 3 illustrates one of the client devices shown in FIG. 2, according to various embodiments.

FIG. 3 illustrates one of the client devices 102$_{1-N}$, according to one or more embodiments. Although a client device 102 is shown for illustrative purposes, it should be understood that the server 130 and the customer device 110 may include similar physical components as the client device 102, but run different software such as the server application 134.

As shown, the client device 102 includes, without limitation, a central processing unit (CPU) 302 and a system memory 304 coupled to a parallel processing subsystem 312 via a memory bridge 305 and a communication path 313. The memory bridge 304 is further coupled to an I/O (input/output) bridge 307 via a communication path 306, and the I/O bridge 307 is, in turn, coupled to a switch 316.

In operation, the I/O bridge 307 is configured to receive user input information from input devices 308, such as a keyboard or a mouse, and forward the input information to the CPU 302 for processing via the communication path 106 and the memory bridge 305. The switch 316 is configured to provide connections between the I/O bridge 307 and other components of the computer system 300, such as a network adapter 318 and various add-in cards 320 and 321.

As also shown, the I/O bridge 307 is coupled to a system disk 314 that may be configured to store content and applications and data for use by CPU 302 and parallel processing subsystem 312. As a general matter, the system disk 314 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 307 as well.

In various embodiments, the memory bridge 305 may be a Northbridge chip, and the I/O bridge 307 may be a Southbridge chip. In addition, communication paths 306 and 313, as well as other communication paths within the client device 102, may be implemented using any technically suitable protocols, including, without limitation, AGP (Accelerated Graphics Port), HyperTransport, or any other bus or point-to-point communication protocol known in the art.

In some embodiments, the parallel processing subsystem 312 comprises a graphics subsystem that delivers pixels to a display device 310 that may be any conventional cathode ray tube, liquid crystal display, light-emitting diode display, or the like. In such embodiments, the parallel processing subsystem 312 incorporates circuitry optimized for graphics and video processing, including, for example, video output circuitry. Such circuitry may be incorporated across one or more parallel processing units (PPUs) included within the parallel processing subsystem 312. In other embodiments, the parallel processing subsystem 312 incorporates circuitry optimized for general purpose and/or compute processing. Again, such circuitry may be incorporated across one or more PPUs included within the parallel processing subsystem 312 that are configured to perform such general purpose and/or compute operations. In yet other embodiments, the one or more PPUs included within the parallel processing subsystem 312 may be configured to perform graphics processing, general purpose processing, and compute processing operations. The system memory 104 includes at least one device driver 103 configured to manage the processing operations of the one or more PPUs within the parallel processing subsystem 312.

In various embodiments, the parallel processing subsystem 312 may be integrated with one or more of the other elements of FIG. 3 to form a single system. For example, the parallel processing subsystem 312 may be integrated with the CPU 302 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, the system memory 304 could be connected to CPU 302 directly rather than through memory bridge 305, and other devices would communicate with the system memory 304 via the memory bridge 305 and the CPU 302. In other alternative topologies, the parallel processing subsystem 312 may be connected to the I/O bridge 307 or directly to the CPU 302, rather than to the memory bridge 305. In still other embodiments, the I/O bridge 307 and the memory bridge 305 may be integrated into a single chip instead of existing as one or more discrete devices. Lastly, in certain embodiments, one or more components shown in FIG. 3 may not be present. For example, the switch 316 could be eliminated, and the network adapter 318 and add-in cards 320, 321 would connect directly to the I/O bridge 307.

Illustratively, the data labeling application 104 that runs in the client device 102 is a web application running in a web browser 330. Although shown as a web application for illustrative purposes, the data labeling application 104 may be implemented as a native application or other type of software in alternative embodiments. Further, functionality of the data labeling application 104 may be distributed across multiple pieces of software in some embodiments. As shown, the system memory 316 stores the web browser 330 and an operating system 340 on which the web browser 330 runs. The operating system 340 may be, e.g., Linux® or Microsoft Windows® and includes a graphics driver 342 that implements a graphics API 332 exposed by the web browser 330 for rendering content, via the parallel processing subsystem 312 (and/or the CPU 302). For example, the graphics API 332 could be WebGL (Web Graphics Library), which is a JavaScript API for rendering interactive 3D and 2D graphics within a compatible web browser. In some embodiments, the data labeling application 104 may invoke the graphics API 332 to render 3D point clouds, and the data labeling application 104 may further provide tools that facilitate the labeling of data.

In alternate embodiments, the system 100 may include any number of client devices 102, any number of servers 130, any number of customer devices 110, any number of memories 304, and any number of processors 302 that are implemented in any technically feasible fashion. Further, the client devices 102, the servers 130, the memory 304, and the processor 302 may be implemented via any number of physical resources located in any number of physical locations. For example, the memory 304 and the processor 302 could be implemented in a cloud computing environment or a distributed computing environment that is accessible to the client device 102. The connection topology between the various units in FIGS. 1 and 2 may be modified as desired.

Cuboid Data Pre-Labeling

Figure 4:
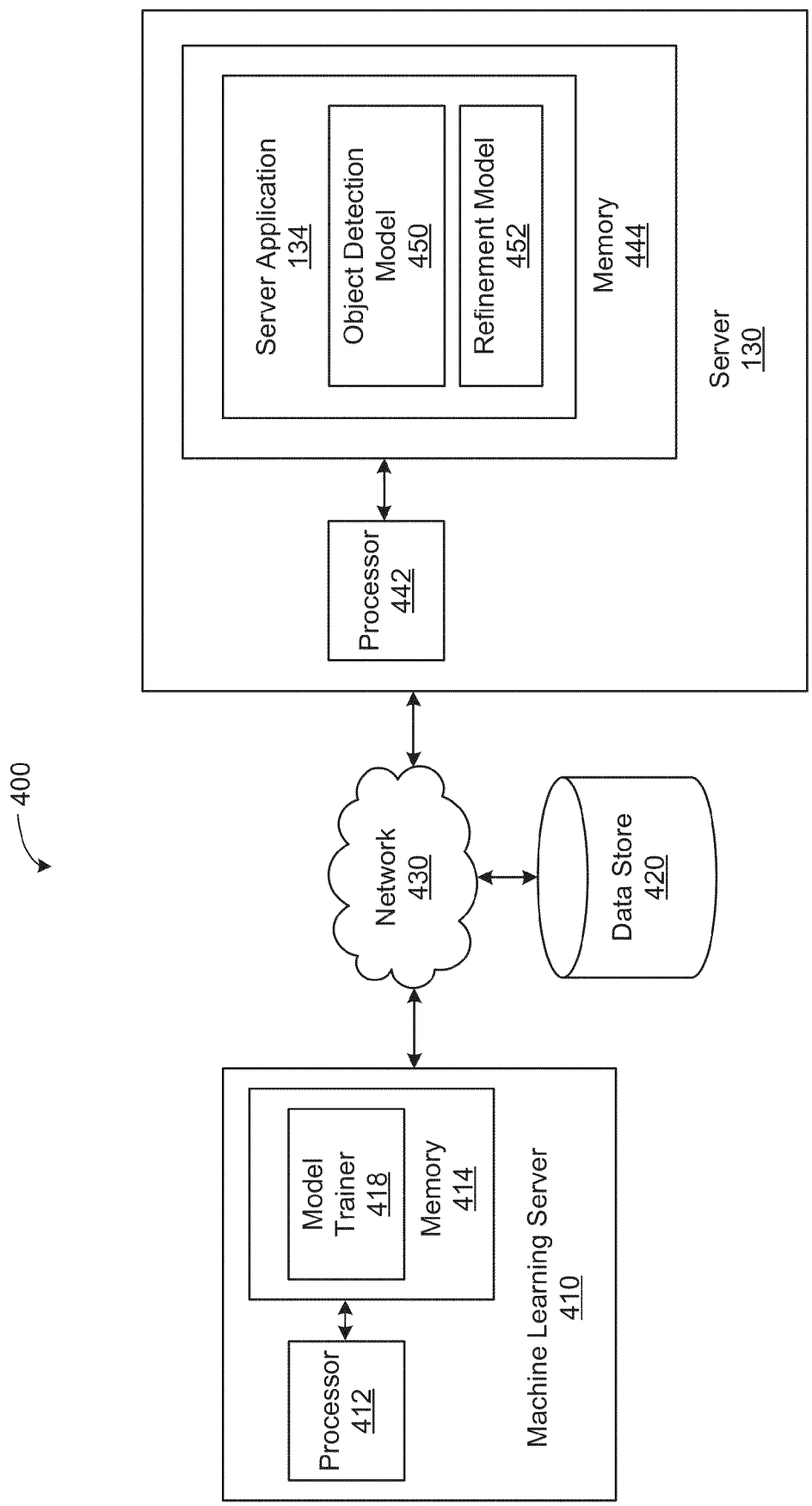
FIG. 4 illustrates a system configured to implement one or more aspects of various embodiments.

FIG. 4 illustrates a system 400 configured to implement one or more aspects of various embodiments. As shown, the system 400 includes a ML server 410, a data store 420, and the server 130, which are in communication over a network 430. The network 430 may be a wide area network (WAN) such as the Internet, a local area network (LAN), or any other suitable network.

As shown, a model trainer 418 executes on a processor 412 of the machine learning (ML) server 410 and is stored in a memory 414 of the ML server 410. The processor 412 receives input user input from input devices, such as a keyboard or a mouse. In operation, the processor 412 is the master processor of the machine learning server 110, controlling and coordinating operations of other system components. In particular, the processor 412 may issue commands that control the operation of a GPU that incorporates circuitry optimized for graphics and video processing, including, for example, video output circuitry. The GPU may deliver pixels to a display device that may be any conventional cathode ray tube, liquid crystal display, light-emitting diode display, or the like.

A system memory 414 of the ML server 410 stores content, such as software applications and data, for use by the CPU 412 and the GPU. The system memory 416 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 416. The storage may include any number and type of external memories that are accessible to the CPU 412 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the ML server 410 shown herein is illustrative and that variations and modifications are possible. For example, the number of CPUs 412, the number of GPUs, the number of system memories 414, and the number of applications included in the system memory 416 may be modified as desired. Further, the connection topology between the various units in FIG. 4 may be modified as desired. In some embodiments, any combination of the CPU 412, the system memory 414, and a GPU may be replaced with any type of virtual computing system, distributed computing system, or cloud computing environment, such as a public or a hybrid cloud.

The model trainer 418 trains one or more ML models that automatically generate cuboid annotations for point cloud data, which is also referred to herein as "pre-labeling" the point cloud data with the cuboid annotations. In some embodiments, the model trainer 418 trains an object detection model 450 that detects objects within point cloud data and determines coarse locations for cuboid annotations bounding those objects, as well as a refinement model 452 that performs localization to determine more accurate locations for the cuboid annotations. Architectures of such machine learning models and techniques for training the same are discussed in greater detail below.

Training data and/or trained ML models may be stored in the data store 420. In some embodiments, the data store 420 may include any storage device or devices, such as fixed disc drive(s), flash drive(s), optical storage, network attached storage (NAS), and/or a storage area-network (SAN). Although shown as accessible over the network 430, in some embodiments the ML server 410 may include the data store 420.

Trained ML models may be deployed to applications that use the ML models to make predictions. Illustratively, the server application 134 is stored in a memory 444, and executes on a processor 442, of the server 130. Components of the computing device 440, including the memory 444 and processor 442 may be similar to corresponding components of the ML server 410 and will not be described in detail herein for conciseness. As described, the server application 134 is configured to process data received via the task API 132 and send the processed data to data labeling applications $104_{1-N}$ running in the client devices $102_{1-N}$, along with indications of data labeling tasks to be performed by users of the client devices $102_{1-N}$, based on a customer's request. In some embodiments, the server application 134 uses ML models including the object detection model 450 and the refinement model 452 to pre-label point cloud data with automatically-generated cuboid annotations. The server application 134 then transmits the pre-labeled data to the data labeling applications $104_{1-N}$ for viewing and editing by users, as discussed in greater detail below.

Unlike traditional ML models that are always required to provide an answer, such as ML models within an autonomous vehicle that must detect vehicles and pedestrians, among other things, the object detection model 450 and the refinement model 452 are allowed to indicate that they cannot make an accurate prediction in some cases. For example, in some embodiments, the refinement model 452 outputs an annotation prediction along with a score indicating how confident the refinement model 452 is in the accuracy of the annotation prediction, as discussed in greater detail below. In such cases, predictions associated with low scores may simply be ignored by users, who may, e.g., specify a threshold below which predictions are not displayed for modification, selection, and/or confirmation. As described in greater detail below, pre-labeled annotations generated using the object detection model 450 and the refinement model 452 may be modified in any feasible manner, such as by dragging the pre-labeled annotations, editing attributes values associated with the pre-labeled annotations, etc. In addition to or in lieu of such modifications, users may be permitted to select and/or confirm pre-labeled annotations, such as cuboid annotations. For example, the pre-labeled annotations themselves may be clicked on to select and/or confirm those annotations, or a selection or confirmation button may be provided for the same. As another example, the pre-labeled annotations may be selected or confirmed if a user elects not to opt out of those annotations. In addition, unlike traditional ML models that may not have access to future information when processing point cloud data, the object detection model 450 and the refinement model 452 may be able to take advantage of pre-recorded point cloud data that includes content from the future and the past of multiple points in time. Such contextual information can be used to more accurately predict cuboid annotations, as discussed in greater detail below.

The number of ML servers and application servers may be modified as desired. Further, the functionality included in any of the applications may be divided across any number of applications or other software that are stored and executed via any number of devices that are located in any number of physical locations.

Figure 5:
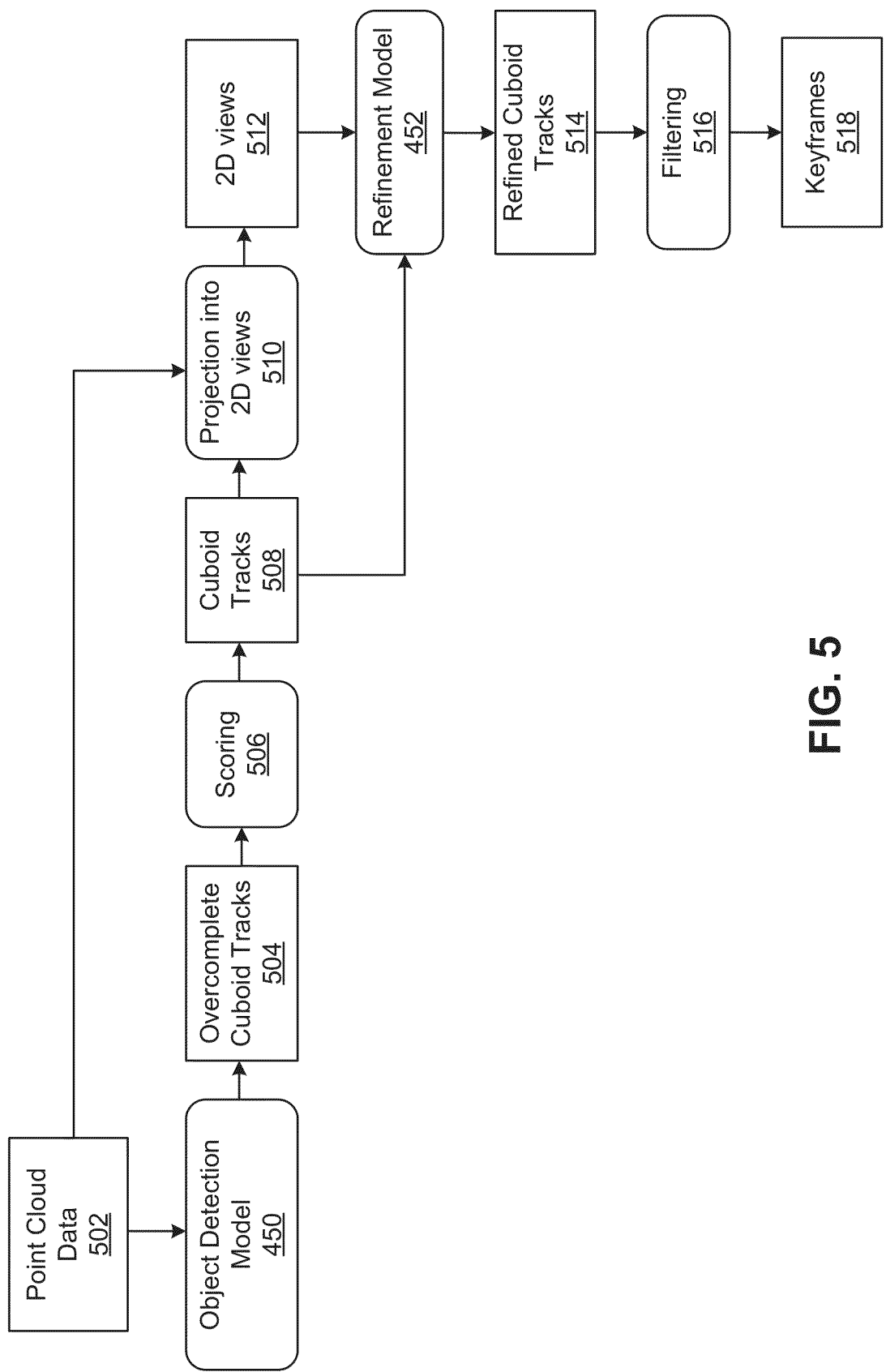
FIG. 5 illustrates an approach for cuboid pre-labeling, according to various embodiments.

FIG. 5 illustrates an approach for cuboid pre-labeling, according to various embodiments. As shown, point cloud data received by the server application 134 is input into the object detection model 450 to determine cuboid tracks. For example, the point cloud data could include LIDAR or radar data captured by sensor(s) on an autonomous vehicle and sent to the server application 134 via the API 132. As used herein, a cuboid "track" refers to a series of cuboid annotations for frames of a video, and a "video" refers to a series of point clouds, which are individually referred to as "frames," that correspond to respective time stamps. Although described herein primarily with respect to videos and that include moving objects, techniques disclosed herein may also be applied to pre-label static point clouds that do not change over multiple frames, as well as an image of point cloud data at a single point in time.

In some embodiments, the object detection model 450 takes as input pairs of consecutive frames in a video and outputs predictions of cuboids bounding objects that are detected in those frames, as well as associations between the detected objects, which can be used to build cuboid tracks. Although sometimes described herein as taking input pairs of consecutive frames as input, in some embodiments the object detection model 450 may receive downsampled versions of the pairs of consecutive frames. For example, each of the input frames could be downsampled to a bird's-eye-view (BEV) projection that includes features at each pixel of the projected image, such as height (e.g., the maximum and minimum point heights) and density information.

By inputting pairs of frames (or downsampled versions thereof) into the object detection model 450, the object detection model 450 can be trained to predict which objects detected in those frames are the same object, i.e., to indicate associations between the detected objects. Given a pair of consecutive frames, the object detection model 450 outputs cuboid attributes that may include a position (e.g., x, y, and z coordinates of a center), size (length of sides), and yaw (i.e., rotation) for each frame, as well as associations between detected objects. The size of a cuboid is also sometimes referred to as the "dimension" of the cuboid.

In some embodiments, the object detection model 450 is a convolutional neural network (CNN). In particular, the object detection model 450 may include neural network layers that detect objects in the input frames and output vectors representing latent variables, as well as a short network that takes as input pairs of such vectors and predicts if the vectors belong to the same object or not.

In some embodiments, the object detection model 450 detects objects and makes relatively coarse localization predictions of where the detected objects are spatially located, and the coarse localization predictions are refined using the refinement model 452, discussed in greater detail below. In such cases, the object detection model 450 may consider the entire space of a limited number of frames, such as the pair of consecutive frames described above, to predict coarse cuboid tracks. Doing so avoids loading the entire video into memory for processing, which may not be feasible due to hardware constraints. By contrast, the refinement model 452 may "zoom in" to consider only a limited extent of space, such as a limited space around the coarse cuboid tracks, but across all of the frames of a video, in order to predict more accurate localization of the cuboid tracks. The refinement model 452 may also make predictions of cuboid attributes including a position, size, and yaw for each frame, albeit more accurately than the object detection model 450. For example, the object detection model 450 could make detections on a grid having 10 to 20 cm cells, while the refinement model 452 could be an order of magnitude more accurate.

In some embodiments, the object detection model 450 may be trained by the model trainer 418 using a multi-task loss function that separately evaluates for position, size (lengths of the sides), and yaw (i.e., rotation), distances between the corners of predicted cuboids that bound objects and corners of ground truth cuboids bounding those same objects. In some embodiments, distance may be computed as smooth-L1 distance, mean squared error (MSE), or any other suitable measure of distance. Although described herein primary with respect to yaw, pitch and roll may also be considered in other embodiments. In the multi-task loss function, distance between corners is used as a proxy for intersection over union (IOU), which cannot generally be used as IOU is not differentiable. However, if the distance between corners is used without evaluating position, size, and yaw separately, then the object detection model 450 may learn to shrink the predicted size of a cuboid when the object detection model 450 is uncertain about the cuboid's yaw, as doing so can minimize the distance between corners during training. Such a shrinking of the cuboid size results from interference by second-derivatives with first derivatives of the loss function and is undesirable.

Some embodiments evaluate distance between corners separately for position, size, and yaw during training. More specifically, the model trainer 418 uses the object detection model 450 to predict, during training, cuboid annotations that are each defined by a position, size, and yaw. For each predicted cuboid annotation, the model trainer 418 keeps the predicted position, while replacing the predicted size and yaw with the actual size and yaw from the ground truth data, and computes distances between corners for only the position using such a cuboid annotation and a ground truth cuboid annotation corresponding to the predicted cuboid annotation. Similarly, the model trainer 418 keeps the predicted size, while replacing the predicted position and yaw with the actual position and yaw, to compute another distance between corners for only the size, and the model trainer 418 keeps the predicted yaw, while replacing the position and size with the actual position and size, to compute yet another distance between corners for only the yaw. The model trainer 418 averages the distances that are separately computed for the position, size, and yaw to determine a multi-task loss, which can then be minimized using, e.g., backpropagation with gradient descent or a variant thereof. That is, the model output is broken up into multiple representations such that the loss function is marginalized along the separate position, size, and yaw predictions; distance between corners is computed against each such representation; and an average is taken over the resulting marginals. Experience has shown that such a multi-task loss function allows for faster convergence during training than some other loss functions, and the object detection model 450 trained using such a multi-task loss function also tends to be more accurate, as the trained model 450 is less sensitive to uncertainty in various dimensions.

In some embodiments, the object detection model 450 may output cuboid tracks 504 that are overcomplete in that multiple tracks are associated with each object, and the tracks may also overlap in time and space (i.e., intersect with one another). For example, the object detection model 450 could output multiple overlapping cuboid tracks corresponding to a vehicle within a point cloud, and the server application 134 would then need to pick the best cuboid track among the multiple overlapping cuboid tracks. As shown, the server application 134 scores the cuboid tracks 504 as being "real" tracks or not at 506 and uses the scores to determine a set of cuboid tracks 508 that do not overlap with each other. For example, higher scores could indicate greater confidence that a cuboid track corresponds to an actual object. In such a case, the server application 134 may score the cuboid tracks and greedily select cuboid tracks associated with higher scores. For example, the server application 134 could use a non-maximum suppression technique to suppress instances with lower scores in order to obtain a set of tracks that do not overlap. Each remaining cuboid track may then be associated with a distinct object.

Then, at 510, the server application 134 projects regions around the cuboid tracks into 2D views 512. In some embodiments, the server application 134 may project the point cloud data around the cuboid associated with the cuboid track in each frame of a video into three 2D views 512, corresponding to the non-occluded sides of the selected object. For example, the region could be a fixed buffer around the cuboid in either absolute (e.g., 1 meter) or relative (e.g., 20%) terms. Such 2D views 512 are similar to what a user may be shown when labeling objects. For example, the three 2D views 512 may correspond to the top, side, and front (or back) of the object that are not occluded from view.

As shown, the 2D views 512 are input by the server application 134 into the refinement model 452 along with the cuboid tracks 508. As described, the refinement model is responsible for performing localization to generate refined cuboid tracks 514, which are more accurate than the cuboid tracks 508 output by the detection model 450, by separately considering the regions around each object across all frames of a video. In some embodiments, the refinement model 452 determines a size of a cuboid track jointly from all frames of a video and outputs one size, but multiple positions and yaws, per cuboid track. It should be noted that, by considering all of the frames of a video, the refinement model 452 is able to exploit the smoothness of some tracks while compensating for noise that may exist in individual frames. This is in contrast to traditional object localization that is typically performed on a frame-by-frame basis. In some embodiments, the refinement model 452 may be a sequence-type model, such as a transformer or a recurrent neural network (RNN).

During training, the refinement model 452 can be trained using cuboid tracks that bound actual objects, such that the refinement model 452 learns to generate smooth cuboid tracks that are kinematically feasible. In some embodiments, the refinement model 452 is trained using a loss function that emphasizes yaw accuracy over position accuracy, and position accuracy over size accuracy. For example, the smooth-L1, mean squared error (MSE), or other distance measure in the loss function described above could be modified with a term that biases the loss function to emphasize yaw accuracy over position accuracy, and position accuracy over size accuracy. It should be understood that the yaw and position of cuboid annotations can change in every frame. By contrast, the size of a cuboid may be constant throughout a cuboid track, and a user change to the size of the cuboid in one frame can be automatically propagated to other frames, making modifications to cuboid size easier than modifying yaw and position. By training the refinement model 452 to prioritize the accuracy of yaw and position predictions over size predictions, the trained refinement model 452 can generate cuboid tracks that are accurate in ways (yaw and position) that cannot be easily corrected by a user and inaccurate in ways (size) that can be easily corrected by a user.

In some embodiments, the object detection model 450 and the refinement model 452 may each be trained for a specific type of object, such as stationary objects, dynamic objects, vehicles, pedestrians, particular types of vehicle, etc. In such cases, multiple object detection and refinement models may be trained and applied to generate cuboid tracks for different types of objects. In alternate embodiments, a single object detection model and refinement model may be trained for multiple types of objects.

Subsequent to obtaining the refined cuboid tracks 514, the server application 134 filters each of the refined cuboid tracks at 516 to generate keyframes 518 that each includes a cuboid annotation. In some embodiments, keyframes are generated separately for each of the cuboid tracks, such that different keyframes may be generated for different cuboid tracks. Between keyframes, cuboid annotations are determined by interpolating the cuboid annotations in neighboring keyframes, and known interpolation techniques may be used to interpolate each of the cuboid annotation attributes (e.g., position, size, and yaw). Each keyframe is a part of a cuboid track, which includes the cuboid annotations in keyframes as well as interpolated cuboid annotations in in-between frames. This sparse representation of cuboid tracks is generally easier for users to edit than the densely-sampled cuboid tracks output by the refinement model 452, which may include a cuboid annotation for every frame. For example, a user could modify the cuboid annotations in only the keyframes of a sparse cuboid track, rather than modifying the cuboid annotations in every frame of a densely-sampled cuboid track.

Figure 8:
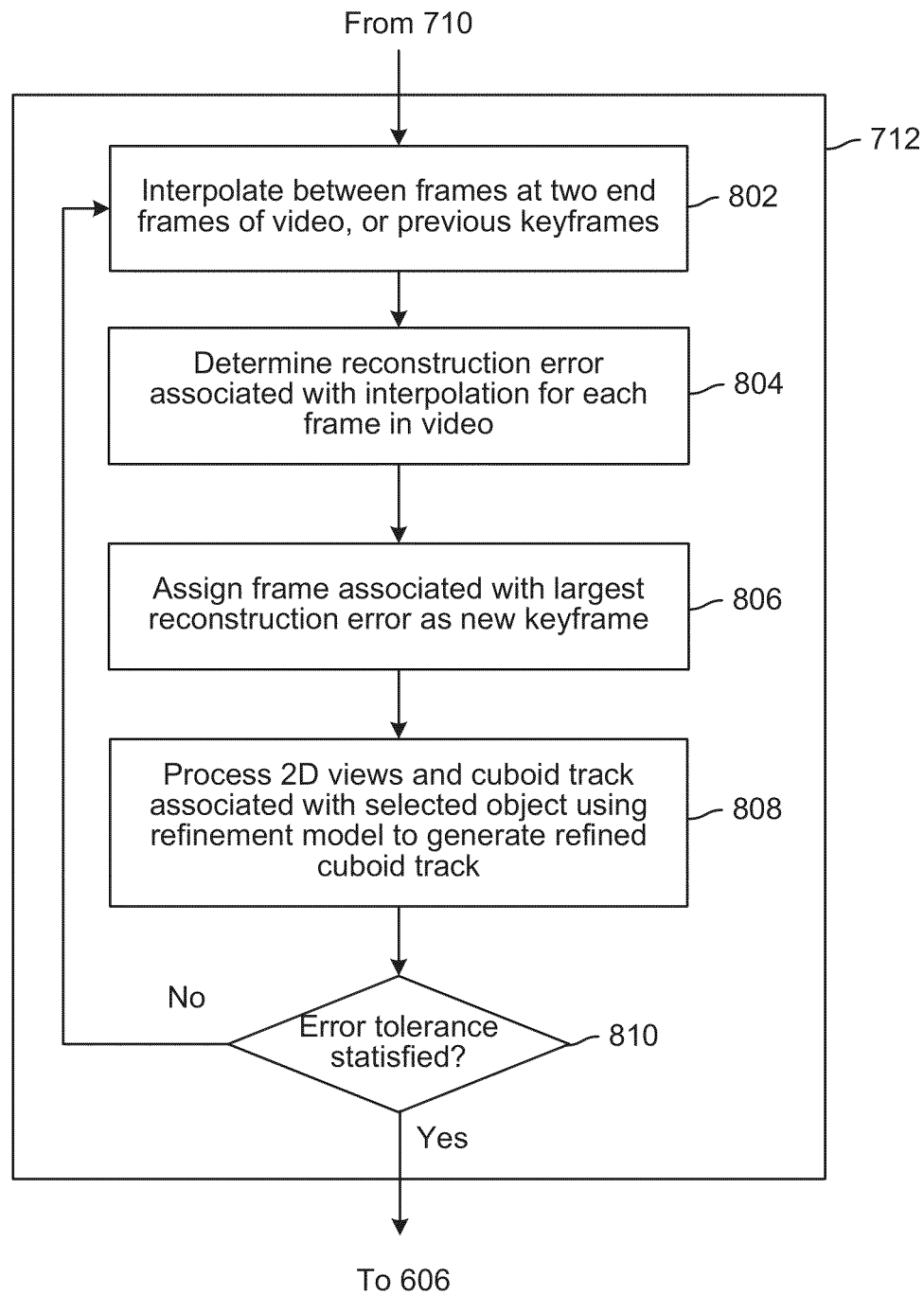
FIG. 8 is a more detailed illustration of one of the steps shown in FIG. 7, according to various embodiments.

In some embodiments, the server application 134 may filter each of the refined cuboid tracks by interpolating the two end frames of the video, determining a reconstruction error of the interpolation, assigning a frame associated with a largest reconstruction error as a new key frame, and recursively repeating the steps of interpolating, determining the reconstruction error, etc., as discussed in greater detail below in conjunction with FIG. 8.

Subsequent to filtering the refined cuboid tracks to generate sparse cuboid tracks, the server application 134 may cause one or more of the sparse cuboid tracks to be displayed to a user for modification, selection, and/or confirmation, as discussed in greater detail below. For example, the server application 134 could transmit pre-labeled annotations, including cuboid tracks, to the client-side data labeling application 104, which may in turn display some or all of the pre-labeled annotations to the user along with user interface (UI) element(s) that permit the user to modify, select, and/or confirm pre-labeled annotations. In some embodiments, the client-side data labeling application 104 may present a UI that permits the user to select a number of pre-labeled annotations to use based on a score threshold, while disregarding other such cuboid tracks. For example, as described above in conjunction with FIG. 4, the refinement model 154 outputs refined cuboid tracks along with scores indicative of how confident the refinement model 154 is in the accuracy of the refined cuboid tracks. The user may indicate a threshold for such a score to select pre-labeled cuboid tracks for use, while ignoring other pre-labeled cuboid tracks, navigate to a keyframe (or interpolated frame) associated with a particular cuboid track, and modify, select, and/or confirm the pre-labeled cuboid annotation in that keyframe. In such a case, the score threshold is defined for the entire scene, as opposed to individual cuboids, and the score threshold is used to narrow down the number of pre-labeled cuboid tracks to those tracks with sufficiently high scores (or low scores, if lower scores indicate greater model confidence in the accuracy of pre-labeled cuboid tracks). In some embodiments, the data labeling application 104 may automatically determine an initial score threshold that is a "best guess" of which annotations are useful to a user based on a number of objects that are detected in point cloud data, and thereafter permit the user to adjust the initial score threshold. For example, the data labeling application 104 could set the score threshold to a higher initial value for scenes that include many clearly visible objects. On the other hand, the score threshold could be set a lower initial score value for scenes that include fewer objects with worse visibility. As another example, the data labeling application 104 may decreased the initial score threshold if there are many objects in a scene so that the user is not overwhelmed with associated pre-labeled annotations, and vice versa if there are few objects in the scene so that the user sees some pre-labeled annotations. That is, the data labeling application 104 may set the initial score threshold such that the number of pre-labeled annotations shown to the user for modification, selection, and/or confirmation is between a minimum and a maximum number. In alternative embodiments, the server application 134 may iteratively generate and cluster multiple cuboid tracks, which are then presented to a user who repeatedly selects the cluster that he or she perceives to bound an object most closely. With such repeated selections, the server application 134 can converge on a cuboid track that closely bounds an object.

Figure 6:
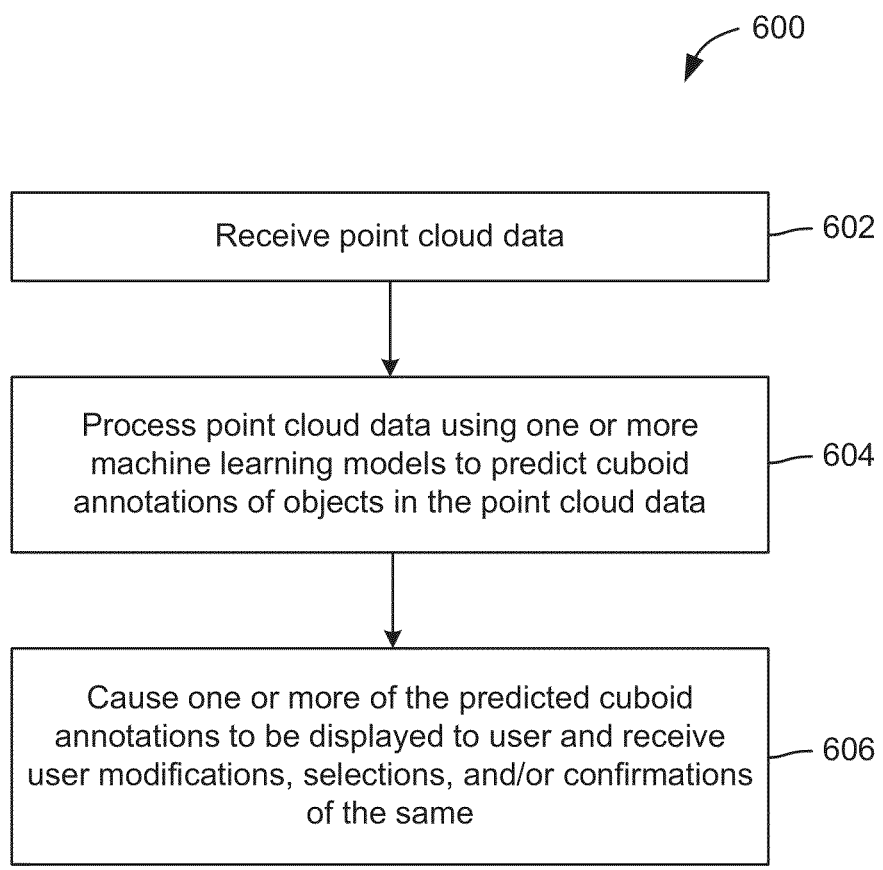
FIG. 6 is a flow diagram of method steps for pre-labeling point cloud data with cuboid annotations, according to various embodiments.

FIG. 6 is a flow diagram of method steps for pre-labeling point cloud data with cuboid annotations, according to various embodiments. Although the method steps are described with reference to the system of FIG. 4, persons skilled in the art will understand that any system may be configured to implement the method steps, in any order, in other embodiments.

As shown, a method 600 begins at step 602, where the server application 134 receives point cloud data. As described, the point cloud data could include, e.g., LIDAR or radar data captured by sensor(s) on an autonomous vehicle and sent by a client to the server application 134 via the API 132.

Figure 7:
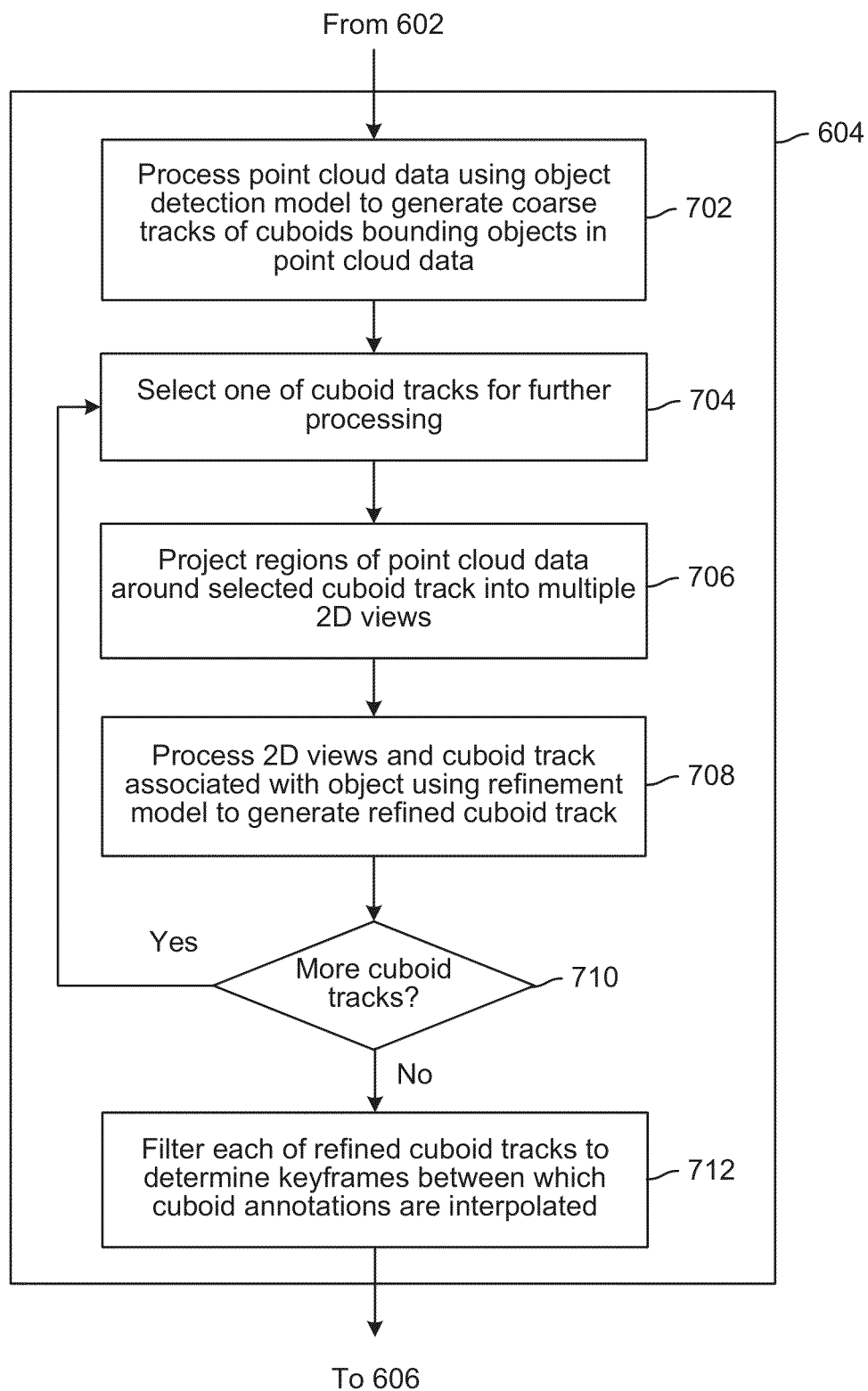
FIG. 7 is a more detailed illustration of one of the steps shown in FIG. 6, according to various embodiments.

At step 604, the server application 134 processes the point cloud data using one or more ML models to predict cuboid annotations for objects in the point cloud data. FIG. 7 is a more detailed illustration of step 604 of FIG. 6, according to various embodiments. As shown, at step 702, the server application 134 processes point cloud data using the object detection model 450 to generate coarse cuboids tracks for the point cloud data. In some embodiments, the server application 134 may downsample the point cloud data prior to inputting the downsampled data into the object detection model 450. For example, the server application 134 could compute a BEV projection of the point cloud data that includes 3D features, such as a density of points, a highest point, and a lowest point, for each pixel of the projected image. In some embodiments in which cuboid tracks generated by the object detection model 450 are overcomplete, the server application 134 may further score the cuboid tracks and greedily select the highest scores (or the lowest scores if lower scores indicate a higher likelihood that cuboid tracks represent actual objects) to obtain a set of cuboid tracks that do not overlap. Each remaining cuboid track may then be associated with a distinct object.

At step 704, the server application 134 selects one of the cuboid tracks for further processing. Then, at step 706, the server application 134 projects regions of the point cloud data around the selected cuboid track into multiple 2D views. As described, in some embodiments, the server application 134 may project, based on the coarse cuboid track generated by the object detection model 450, a fixed buffer around the selected cuboid track in each frame of a video into three 2D views, corresponding to the non-occluded sides of the selected object, such as the back (or front), side, and top (overhead) of the object. Such 2D views are similar to what a user may be shown when performing labeling tasks, and the 2D views are input into the refinement model 452 to determine more accurate cuboid tracks. In some embodiments, generating the 2D views may include downsampling the point could data, but to less of a degree than the BEV projections that are input into the object detection model 450. For example, the resolution of the 2D views could be 5-6 higher than that of the BEV projections.

At step 708, the server application 134 processes the 2D views and the selected cuboid track using the refinement model 452 to generate a refined cuboid track. As described, this is a localization step at which attributes of the cuboid, including the size, position, and yaw are more accurately determined based on higher-resolution images of the point cloud data around a particular track for all frames of a video, in contrast to the coarse cuboid tracks determined by the object detection model 450 at step 702.

At step 710, if more objects have been detected, then the method 600 returns to step 704, where the server application 134 selects another cuboid track to process. That is, the server application 134 refines each of the cuboid tracks generated using the object detection model (and the subsequent suppression of cuboid tracks with, e.g., lower scores) separately to obtain more accurate cuboid tracks. Although the refinement of cuboid tracks is shown as being sequentially for illustrative purposes, the server application 134 may refine multiple cuboid tracks in parallel in alternative embodiments.

On the other hand, if no more objects have been detected, then the method 600 continues to step 712, where the server application 134 filters each of the refined cuboid tracks to determine keyframes between which cuboid annotations are interpolated. In some embodiments, this filtering is performed separately for each of the refined cuboid tracks. As a result, different keyframes may be determined for different cuboid tracks. FIG. 8 is a more detailed illustration of step 712 of FIG. 7, according to various embodiments. As shown, at step 802, the server application 134 starts at the two end frames of the video and interpolates between those frames. That is, the server application 134 assigns the first and last frames of the video as keyframes, and the server application 134 determines cuboid annotations for frames between the first and last frames by interpolating between the cuboid annotations in the first and last frames.

At step 804, the server application 134 determines a reconstruction error associated with the interpolation for each frame in the video. The reconstruction error is a difference between the interpolated cuboid annotations and the cuboid annotations in the refined cuboid tracks determined at step 708.

At step 806, the server application 134 assigns a frame associated with a largest reconstruction error as a new keyframe. At step 808, if an error tolerance has not yet been reached, i.e., the largest reconstruction error is above a user-defined threshold value, then the server application 134 returns to step 802 and recursively performs the interpolating, determining the reconstruction error, etc. again for each pair of successive keyframes. Otherwise, if the error tolerance has been satisfied, then the method 600 continues to step 606.

Figure 9:
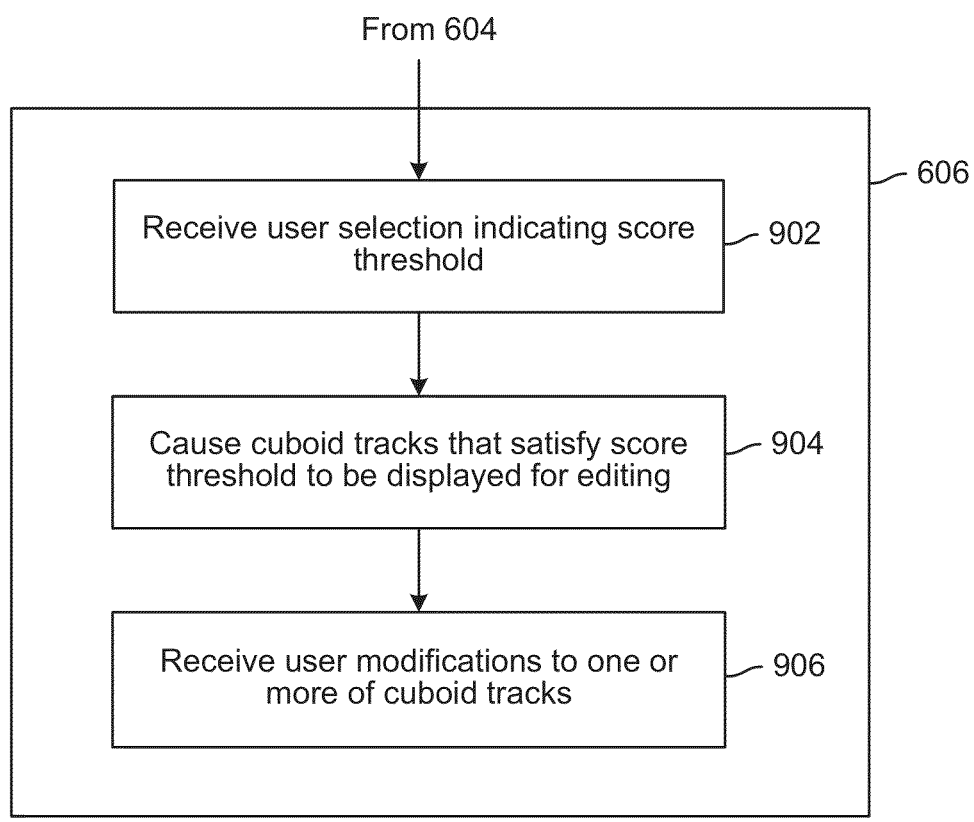
FIG. 9 is a more detailed illustration of another one of the steps shown in FIG. 6, according to various embodiments.

Returning to FIG. 6, at step 606, the server application 134 causes one or more of the predicted cuboid annotations to be displayed to a user and receives user modifications, selections, and/or confirmations of the same. As described, the server application 134 may send pre-labeled annotations to a data labeling application 104 running on a client device, which may in turn present a UI displaying one or more of the pre-labeled annotations and element(s) that permit the user to modify, select, and/or confirm the same. FIG. 9 is a more detailed illustration of step 606 of FIG. 6, according to various embodiments. As shown, at step 902, the data labeling application 104 receives a user selection indicating a score threshold. As described, in some embodiments, the refinement model 452 outputs, along with pre-labeled cuboid tracks, scores indicating the predicted accuracy of those pre-labeled cuboid tracks. In such cases, the user may indicate a score threshold for pre-labeled cuboid tracks that the user wants to use (by modifying, selecting, and/or confirming the same), and the server application 134 may display only those pre-labeled cuboid tracks satisfying the user-specified score threshold. It should be understood that pre-labeled cuboid tracks associated with scores that do not satisfy the score threshold may be inaccurate. To save time, a user may prefer to use only pre-labeled cuboid tracks that satisfy the score threshold, while drawing other cuboid tracks by hand. Although described herein primarily with respect to cuboid tracks, alternative embodiments may display other pre-labeled annotations such as semantic segmentation annotations, annotation masks from partial segmentation, and/or other discrete annotations of 2D images or videos.

Figure 10:
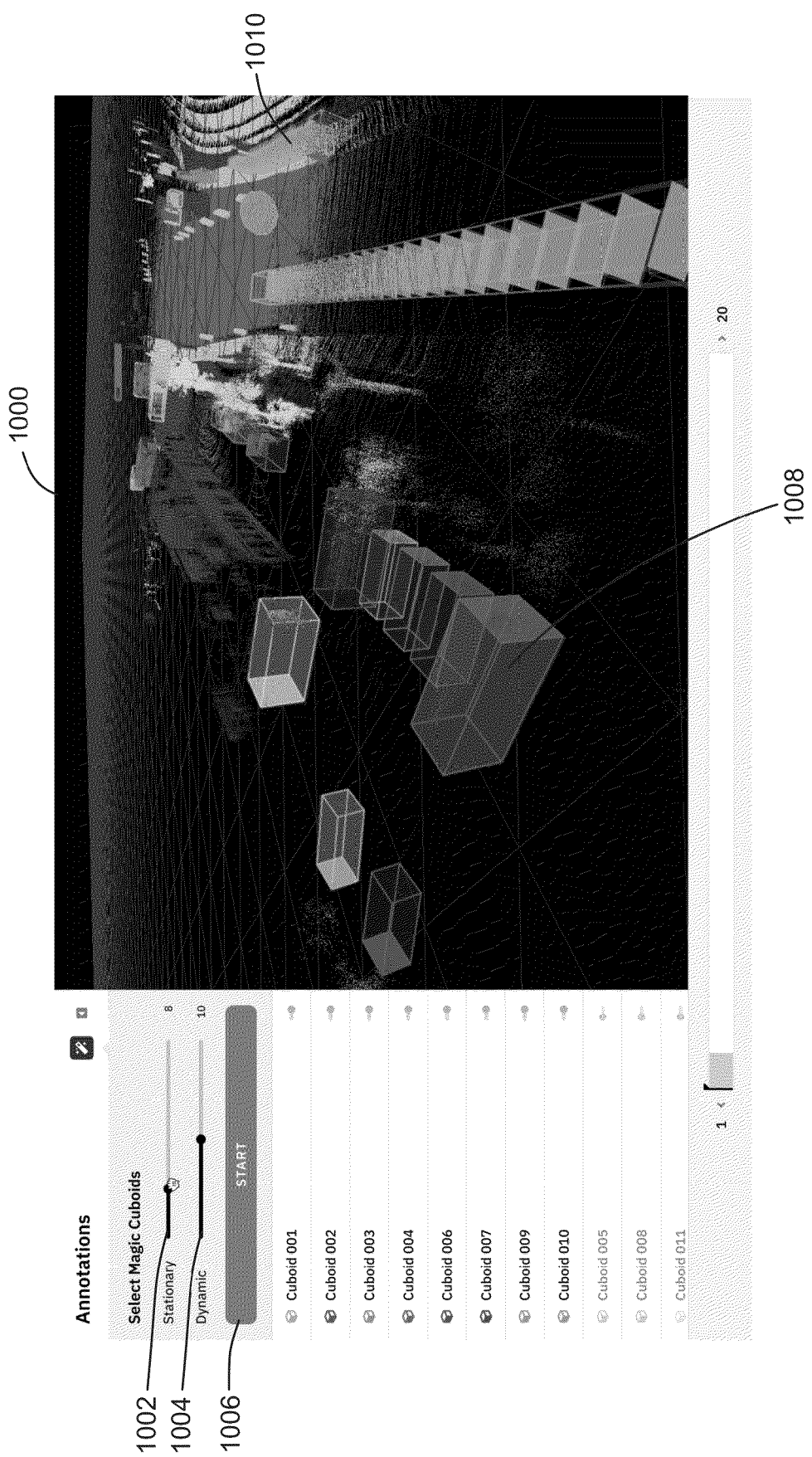
FIG. 10 illustrates an example user interface for selecting and editing pre-labeled cuboid annotations, according to various embodiments.

FIG. 10 illustrates an example user interface 1000 for selecting and editing pre-labeled cuboid annotations, according to various embodiments. The UI 1000 is generated by the data labeling application 104 in some embodiments. As described, pre-labeled annotations other than cuboid tracks, such as semantic segmentation annotations, annotation masks from partial segmentation, and/or other discrete annotations of 2D images or videos, may be displayed in addition to, or in lieu of, cuboid tracks in some embodiments.

As shown, the UI 1000 includes two sliders 1002 and 1004 that a user may adjust to select a number of cuboids tracks to use, while hiding other cuboid tracks. Higher selected values of the sliders 1002 and 1004 result in more cuboids being displayed, and vice versa, which is relatively intuitive for users to understand. In some embodiments, the data labeling application 104 determines an inverse of the user-specified number of cuboid tracks as a score threshold, described above in conjunction with FIGS. 5 and 9, and displays only those cuboid tracks satisfying the score threshold. Illustratively, two sliders 1002 and 1004 are provided for adjusting the displayed number of pre-labeled cuboids tracks associated with dynamic and static objects, respectively, which are predicted by a dynamic model and a static model, respectively. As described, multiple models may be used to predict cuboid tracks for different types of objects such as static objects, dynamic objects, vehicles, pedestrians, particular types of vehicles, etc.

As shown, cuboid annotations (e.g., cuboid 1008) that do not satisfy a score threshold determined based on the slider 1002 and 1004 values are initially displayed as ghosted white cuboids with low opacity in the UI 1000. By contrast, cuboid annotations (e.g., cuboid 1010) that satisfy the score threshold are shown with other colors and normal opacity. After the user presses a start button 1006 to begin modifying, selecting, and/or confirming cuboid annotations that satisfy the score threshold (and/or drawing other annotations), the cuboid annotations that do not satisfy the score threshold are hidden from display.

Figure 11:
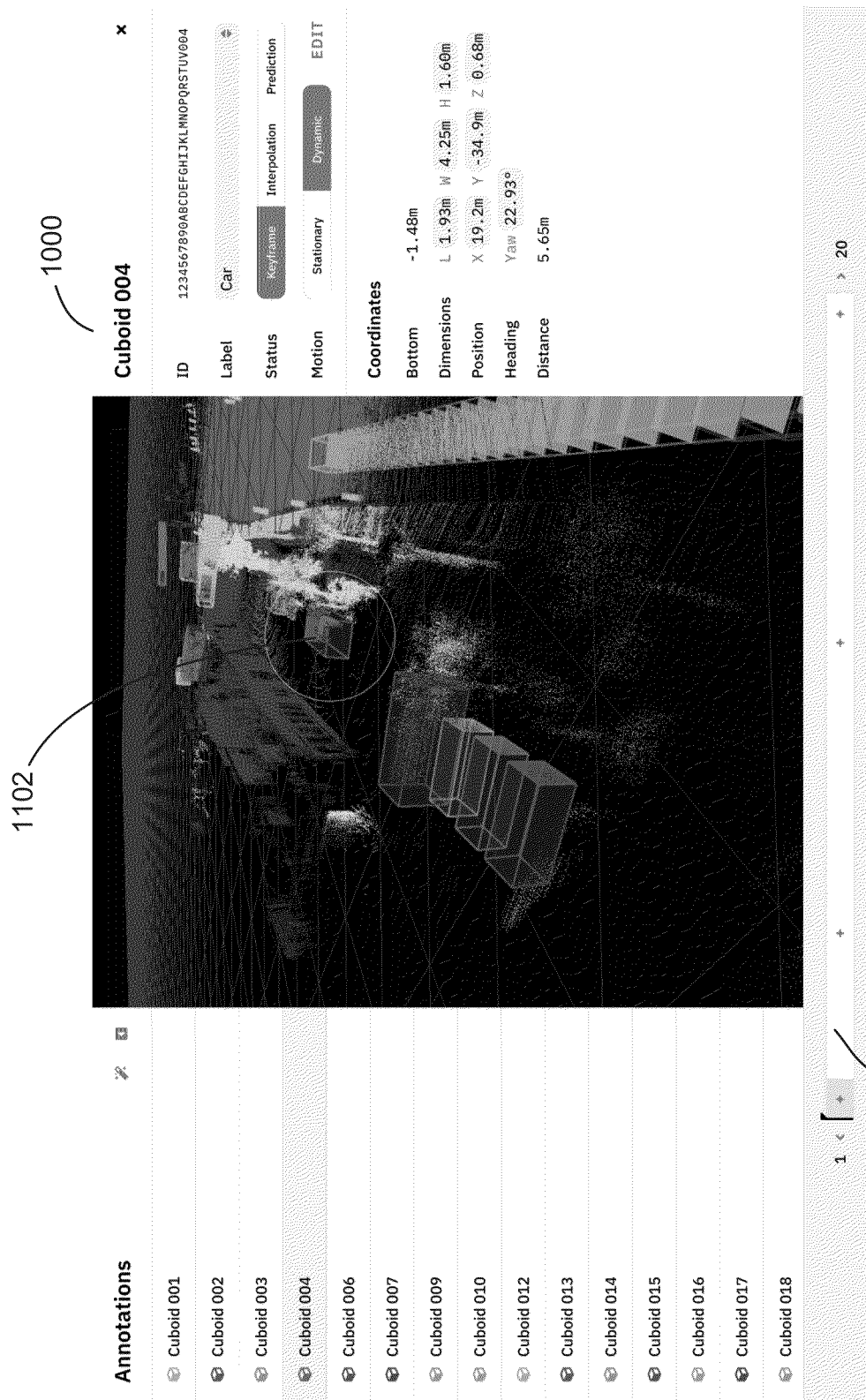
FIG. 11 illustrates the user interface of FIG. 10 when cuboid annotations satisfying a score threshold are displayed, according to various embodiments.

Returning to FIG. 9, at step 904, the data labeling application 104 causes cuboid tracks that satisfy the score threshold to be displayed for editing. FIG. 11 illustrates the UI 1000 after a user has pressed the start button 1006 and cuboid annotations satisfying the score threshold are displayed, according to various embodiments. The user is permitted to interact with automatically-generated cuboid annotations in the same manner as manually drawn cuboid annotations. As shown, after an automatically generated cuboid annotation 1102 is selected by the user, the data labeling application 104 updates a timeline 1104 to indicate keyframes associated with the selected cuboid track with "+" icons. In some embodiments, the user may be permitted to view and edit the cuboid track associated with one (selected) object at a time.

Figure 12:
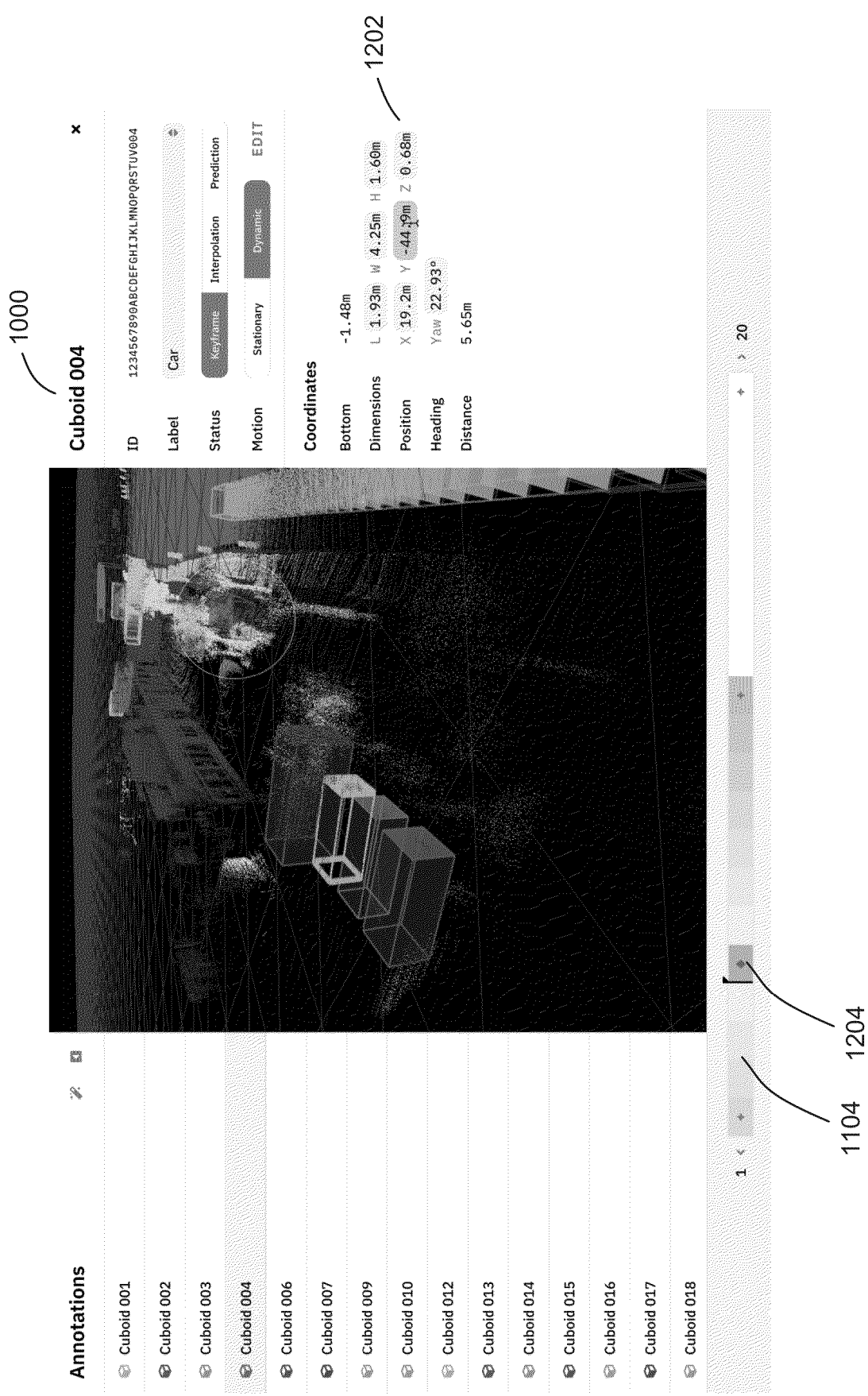
FIG. 12 illustrates the user interface of FIG. 10 after a user has modified a cuboid annotation in a keyframe, according to various embodiments.

At step 906, the data labeling application 104 receives user modifications to one or more of the cuboid tracks. As described, the user may interact with pre-labeled cuboid annotations in the same manner as manually drawn cuboid annotations in some embodiments. FIG. 12 illustrates the UI 1000 after a user has modified a cuboid annotation in a keyframe, according to various embodiments. As shown, a user can navigate to a keyframe indicated by a "+" icon in the timeline 1104 to begin modifying the keyframe. Alternatively, a user can navigate to an interpolated frame that is not associated with a displayed icon in the timeline 1104. In this example, the user has navigated to a keyframe and changed the position attribute of the cuboid annotation in that keyframe. Illustratively, the position of the cuboid annotation is changed in a sidebar 1202. As described, cuboid annotations may be modified in any feasible manner, such as by dragging the cuboid annotations, editing attributes of the cuboid annotations in the sidebar 1202, etc. In addition to or in lieu of modifications, a UI may permit users to select and/or confirm pre-labeled annotations, such as cuboid annotations. For example, the pre-labeled annotations themselves may be clicked on to select and/or confirm those annotations, or a selection or confirmation button may be provided for the same.

As shown, the data labeling application 104 has updated the timeline 1104 to include a diamond icon 1204 indicating the user-modified keyframe. In some embodiments, the data labeling application 104 may also animate out from the modified keyframe to show the interpolated frames that will be affected by a modification to the keyframe. In such cases, the animation may be temporary, and the UI 1000 may return to the static timeline indicating automatically-generated keyframes and manual keyframes generated as a result of user modifications to a keyframe or an interpolated frame.

In some embodiments, the object detection model 450 and/or the refinement model 452 may be re-trained using user modifications, selections, and/or confirmations of pre-labeled cuboid annotations. As a result, the object detection model 450 and/or the refinement model 452 can be continually improved to generate more accurate pre-label cuboid annotations. For example, the performance of the object detection model 450 and the refinement model 452 can be evaluated based on the time spent by users to correct pre-labeled cuboid annotations (less is better) and/or the error between the pre-labeled cuboid annotations and user modifications, which can be broken down into errors in position, dimension, rotation change, and rotation direction. The results of such an evaluation can be used to inform re-training of the object detection model 450 and/or the refinement model 452. For example, the bias in the loss function used to train the refinement model 452 that is described above could be adjusted based on the results of the evaluation.

After beginning to modify and/or add annotations to a scene, a user can return to adjusting the sliders 1002 and 1004 to change the score threshold such that different numbers of pre-labeled cuboid tracks associated with dynamic and static objects, respectively, are displayed for the user to modify, select, and/or confirm.

Figure 13:
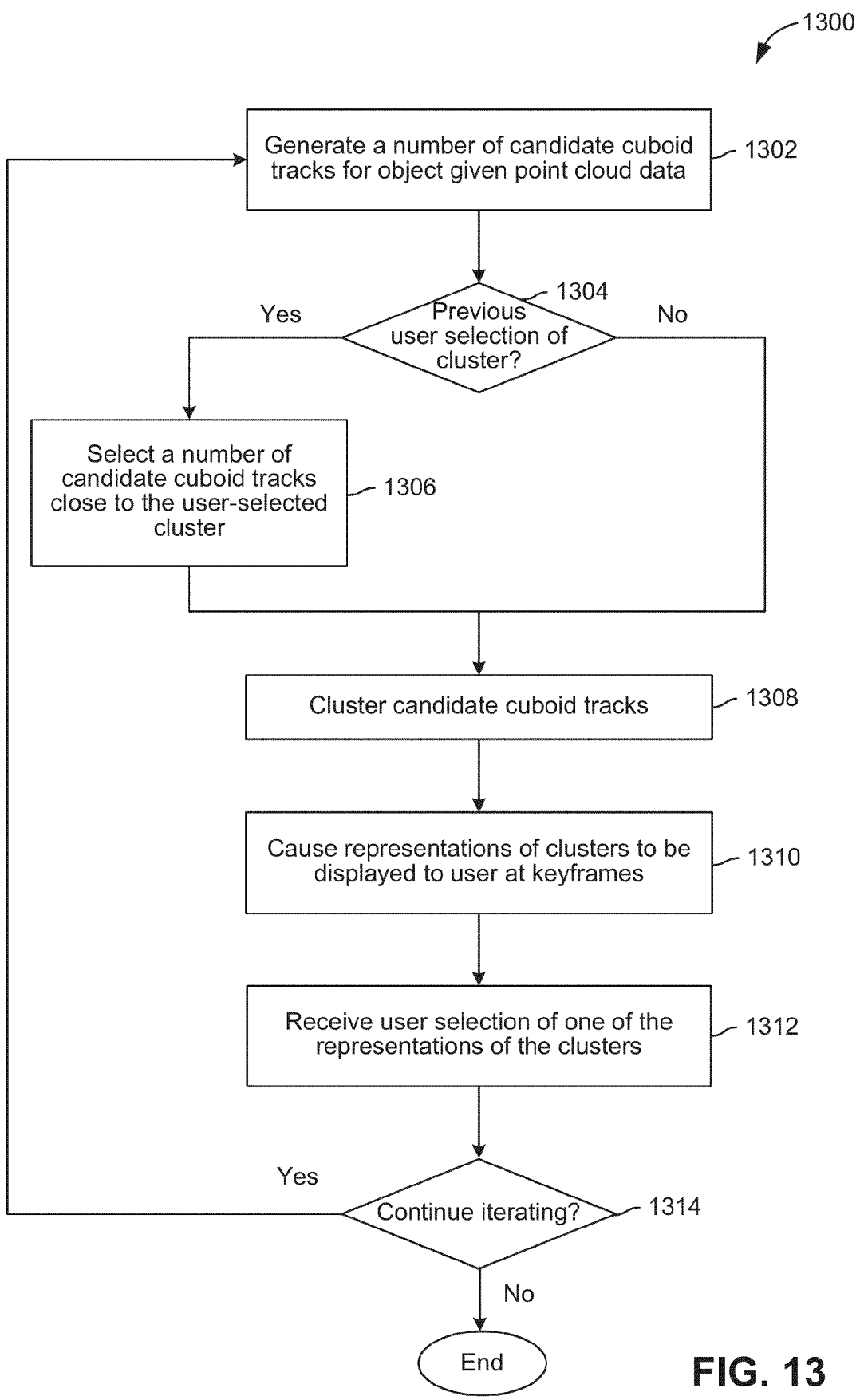
FIG. 13 is a flow diagram of method steps for generating and displaying cuboid annotations for a user to modify, select, and/or confirm, according to various embodiments.

FIG. 13 is a flow diagram of method steps for generating and displaying cuboid annotations for a user to modify, select, and/or confirm, according to various embodiments. Although the method steps are described with reference to the system of FIG. 4, persons skilled in the art will understand that any system may be configured to implement the method steps, in any order, in other embodiments.

As shown, a method 1300 begins at step 1302, where the server application 134 generates a number of candidate cuboid tracks for an object given point cloud data. Although described with respect to candidate cuboid tracks for a single object for simplicity, it should be noted that multiple objects may be processed according to the same steps shown in FIG. 13. In some embodiments, the object detection model 450 and the refinement model 452 may be trained such that a distribution of cuboid tracks is generated for each object, rather than a single cuboid track per object. For example, modified variational auto encoders (VAEs) could be trained to generate a distributions of cuboid tracks, each of which is considered a candidate cuboid track. As discussed in greater detail below, representative members of clusters of cuboid annotations in keyframes that are associated with each candidate track may then be displayed for selection by a user. As another example, multiple models could be used to generate different candidate cuboid tracks.

At step 1304, assuming no prior user selections have been made, then the method 1300 proceeds directly to step 1308, where the server application 134 clusters the candidate cuboid tracks. In some embodiments, the clustering may be based on a proxy to perceptual similarity, causing candidate cuboid annotations to be clustered in a manner that users would perceive to be similar. For example, IOU may be used as the proxy for perceptual similarity.

At step 1310, the server application 134 causes representations of the clusters to be displayed to the user at a number of keyframes. In some embodiments, the representations are representative members of each cluster, such as members having the smallest average perceptual difference with respect to other members of the cluster, that are displayed at keyframes associated with the object. In such a case, the server application 134 may transmit the representative members at the keyframes to the data labeling application 104 for display to a user.

At step 1312, the server application 134 receives a user selection of one of the representations (e.g., a representative member) of the clusters. As described, the user is expected to select one of the cuboid annotation clusters that he or she perceives to be closest to bounding the object within the point cloud data. In some embodiments, the user may interact with the data labeling application 104 to make such a selection. By repeatedly having the user select a closest cuboid annotation cluster, the server application 134 can converge on a cuboid annotation that closely bounds the object.

At step 1314, if the server application 134 determines to stop iterating for the object, then the method 1300 ends. In some embodiments, the terminating condition to stop iterating at step 1314 may be that the selected cluster has an intra-cluster variation smaller than a threshold. Alternatively, a user may select to stop the iterating if, e.g., the user decides that the selected representation of the cuboid annotation cluster closely bounds the corresponding object.

On the other hand, if the server application 134 determines to continue iterating for the same object at step 1314, then the method 1300 returns to step 1302, where the server application 134 generates candidate cuboid annotations again for the particular object. However, during the next iteration, the server application 134 will select a number of candidate annotations that are close to (e.g., within some threshold of) the user-selected cluster at step 1306, after which the clustering at step 1308 is performed on only the selected candidate annotations.

In sum, techniques are disclosed for automatically pre-labeling point cloud data with cuboid annotations. Point cloud data is processed using ML models to detect, associate, and localize objects therein, in order to generate cuboid tracks that each include a series of cuboid annotations associated with an object. An object detection model that detects objects and performs coarse localization is trained using a multi-task loss function that separately evaluates the distances between the corners of predicted cuboids and corners of ground truth cuboids for position, size, and yaw. A refinement model that performs more accurate localization takes as input 2D projections of regions surrounding cuboid tracks predicted by the object detection model and the cuboid tracks themselves and outputs refined cuboid tracks. The refined cuboid tracks are filtered to reduce the cuboid tracks to a set of keyframes, with frames between the keyframes being interpolated. The cuboid tracks can then be presented to a user, who can view and edit the cuboid tracks based on a confidence interval, or iteratively select among multiple cuboid tracks until convergence to an accurate cuboid track.

One advantage of the disclosed techniques is that cuboid annotations are automatically generated from point cloud data and presented to users, who can select which cuboid annotations to use and make modifications, selections, and/or confirmations of those cuboid annotations. Doing so facilitates user labeling of point cloud data with cuboid annotations. In particular, pre-labeled cuboid annotations generated via techniques disclosed herein can reduce user labeling time, rather than increasing labeling time by requiring the users to correct inaccurate pre-labeled annotations. The ML models disclosed herein utilize contextual information from past and future frames of each video frame to more accurately predict cuboid annotations. Further, a multi-task loss function is disclosed that enables relatively fast training of a ML model for objection detection, and the trained object-detection model can be more accurate than models trained using other loss functions. In addition, UIs are disclosed that permit users to view and modify pre-labeled cuboid annotations intuitively and efficiently. These technical advantages represent one or more technological advancements over prior art approaches.

1. In some embodiments, a computer-implemented method for annotating point cloud data comprises: processing point cloud data using at least one machine learning (ML) model to generate annotations of objects in the point cloud data; and causing to be displayed at least one of the annotations and at least one user interface element that permits a user to select, confirm, or modify the at least one of the annotations that is displayed.

2. The computer-implemented method according to clause 1, wherein the annotations of objects include cuboid annotations.

3. The computer-implemented method according to clause 1 or clause 2, wherein processing the point cloud data using the at least one ML model comprises: processing the point cloud data using a first ML model to determine cuboid tracks associated with the objects; projecting regions of the point cloud data including the objects to a plurality of two-dimensional (2D) views; and processing the plurality of 2D views and the cuboid tracks using a second ML model to determine updated cuboid tracks associated with the objects.

4. The computer-implemented method according to any of clauses 1-3, wherein the first ML model is trained using a loss function evaluated by performing steps including: predicting, using the first ML model, a first cuboid annotation; determining a first distance between corners of a cuboid annotation included in training data and a second cuboid annotation that includes a size of the first cuboid annotation, a position of the cuboid annotation included in the training data, and a yaw of the cuboid annotation included in the training data; determining a second distance between corners of the cuboid annotation included in the training data and a third cuboid annotation that includes a position of the first cuboid annotation, a size of the cuboid annotation included in the training data, and a yaw of the cuboid annotation included in the training data; determining a third distance between corners of the cuboid annotation included in the training data and a fourth cuboid annotation that includes a yaw of the first cuboid annotation, a size of the cuboid annotation included in the training data, and a position of the cuboid annotation included in the training data; and determining an average of the first distance, the second distance, and the third distance.

5. The computer-implemented method according to any of clauses 1-4, wherein processing the point cloud data using the first ML model comprises sequentially inputting pairs of frames of the point cloud data into the first ML model.

6. The computer-implemented method according to any of clauses 1-5, wherein the cuboid tracks determined using the first ML model are overcomplete, and further comprising determining a subset of the cuboid tracks based on scores assigned to the cuboid tracks and spatial locations of the cuboid tracks.

7. The computer-implemented method according to any of clauses 1-6, wherein determining the subset of cuboid tracks includes using a non-maximum suppression technique to suppress cuboid tracks that are assigned low scores.

8. The computer-implemented method according to any of clauses 1-7, further comprising determining, based on the annotations of objects in the point cloud data, at least one keyframe including annotations of objects therein.

9. The computer-implemented method according to any of clauses 1-8, further comprising receiving, from the user, a selection of the at least one of the annotations to display.

10. The computer-implemented method according to any of clauses 1-9, wherein the user selection of the at least one of the annotations to display is based on the at least one of the annotations satisfying a score threshold.

11. The computer-implemented method according to any of clauses 1-10, further comprising determining the at least one of the annotations to display based on a number of the objects in the point cloud data.

12. The computer-implemented method according to any of clauses 1-11, wherein the at least one of the annotations displayed to the user include first representatives of clusters of annotations of one of the objects, and the method further comprises displaying second representatives of additional clusters of annotations of the one of the objects based on a user selection of one of the first representatives of the clusters of annotations.

13. The computer-implemented method of according to any of clauses 1-12, further comprising training the at least one ML model based on selections, confirmations, or modifications received from the user.

14. In some embodiments, a computer-implemented method for labeling data comprises: processing data using at least one machine learning (ML) model to generate annotations of objects in the data; determining, based on a user-specified threshold, one or more of the annotations; and causing to be displayed the one or more annotations and at least one user interface element that permits a user to select, confirm, or modify the at least one of the annotations that is displayed.

15. The computer-implemented method according to clause 14, wherein the annotations include at least one of cuboid annotations, semantic segmentation annotations, partial segmentation annotations, or video annotations.

16. The computer-implemented method according to any of clauses 14-15, wherein the user-specified threshold indicates a number of the annotations to display.

17. The computer-implemented method according to any of clauses 14-16, wherein the one or more annotations are determined based on an inverse of the user-specified threshold.

18. The computer-implemented method according to any of clauses 14-17, wherein the user-specified threshold is a threshold associated with annotations generated by one of the at least one ML model.

19. The computer-implemented method according to any of clauses 14-18, wherein the one of the at least one ML model is trained to generate annotations associated with either dynamic objects or static objects.

20. In some embodiments, a computer-implemented method for training a machine learning (ML) model comprises: receiving training data including point cloud data and labeled cuboids bounding objects in the point cloud data; and training a ML model using a loss function that is evaluated by performing steps including: predicting, using the ML model, a first cuboid annotation, determining a first distance between corners of one of the labeled cuboids included in the training data and a second cuboid annotation that includes a size of the first cuboid annotation, a position of the one of the labeled cuboids, and a yaw of the one of the labeled cuboids, determining a second distance between corners of the one of the labeled cuboids and a third cuboid annotation that includes a position of the first cuboid annotation, a size of the one of the labeled cuboids, and a yaw of the one of the labeled cuboids, determining a third distance between corners of the one of the labeled cuboids and a fourth cuboid annotation that includes a yaw of the first cuboid annotation, a size of the one of the labeled cuboids, and a position of the one of the labeled cuboids, and determining an average of the first distance, the second distance, and the third distance.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for annotating point cloud data, the method comprising:
    training a first machine learning (ML) model using a loss function evaluated by performing steps including:
        predicting, using the first ML model, a first cuboid annotation;
        determining a first distance between corners of a cuboid annotation included in training data and a second cuboid annotation that includes a size of the first cuboid annotation, a position of the cuboid annotation included in the training data, and a yaw of the cuboid annotation included in the training data;
        determining a second distance between corners of the cuboid annotation included in the training data and a third cuboid annotation that includes a position of the first cuboid annotation, a size of the cuboid annotation included in the training data, and a yaw of the cuboid annotation included in the training data;
        determining a third distance between corners of the cuboid annotation included in the training data and a fourth cuboid annotation that includes a yaw of the first cuboid annotation, a size of the cuboid annotation included in the training data, and a position of the cuboid annotation included in the training data; and determining an average of the first distance, the second distance, and the third distance;

processing the point cloud data using the first ML model and a second ML model to generate cuboid annotations of objects in the point cloud data by performing steps including:

processing the point cloud data using the first ML model to determine cuboid tracks associated with the objects;

projecting regions of the point cloud data including the objects to a plurality of two-dimensional (2D) views; and processing the plurality of 2D views and the cuboid tracks using the second ML model to determine updated cuboid tracks associated with the objects;

determining a confidence threshold based on a count of the cuboid annotations; and causing to be displayed at least one of the cuboid annotations based on the confidence threshold, and at least one user interface element that permits a user to select, confirm, or modify the at least one of the cuboid annotations that is displayed.

2. The computer-implemented method of claim 1, wherein processing the point cloud data comprises sequentially inputting pairs of frames of the point cloud data into the first ML model.

3. The computer-implemented method of claim 1, wherein the cuboid tracks determined using the first ML model are overcomplete, and further comprising determining a subset of the cuboid tracks based on scores assigned to the cuboid tracks and spatial locations of the cuboid tracks.

4. The computer-implemented method of claim 3, wherein determining the subset of cuboid tracks includes using a non-maximum suppression technique to suppress cuboid tracks that are assigned low scores.

5. The computer-implemented method of claim 1, further comprising determining, based on the cuboid annotations of objects in the point cloud data, at least one keyframe including annotations of objects therein.

6. The computer-implemented method of claim 1, further comprising receiving, from the user, a selection of the at least one of the cuboid annotations to display.

7. The computer-implemented method of claim 1, wherein causing the at least one of the cuboid annotations to be displayed comprises determining at least one of a color or an opacity associated with the at least one of the cuboid annotations based on the at least one of the cuboid annotations satisfying the confidence threshold.

8. The computer-implemented method of claim 1, further comprising determining the at least one of the cuboid annotations to display based on a number of the objects in the point cloud data.

9. The computer-implemented method of claim 1, wherein the at least one of the cuboid annotations displayed to the user include first representatives of clusters of annotations of one of the objects, and the method further comprises displaying second representatives of additional clusters of annotations of the one of the objects based on a user selection of one of the first representatives of the clusters of annotations.

10. The computer-implemented method of claim 1, further comprising training at least one of the first ML model or the second ML model based on selections, confirmations, or modifications received from the user.

11. A computer-implemented method for labeling data, the method comprising:

training a first machine learning (ML) model using a loss function evaluated by performing steps including:

predicting, using the first ML model, a first cuboid annotation;

determining a first distance between corners of a cuboid annotation included in training data and a second cuboid annotation that includes a size of the first cuboid annotation, a position of the cuboid annotation included in the training data, and a yaw of the cuboid annotation included in the training data;

determining a second distance between corners of the cuboid annotation included in the training data and a third cuboid annotation that includes a position of the first cuboid annotation, a size of the cuboid annotation included in the training data, and a yaw of the cuboid annotation included in the training data;

determining a third distance between corners of the cuboid annotation included in the training data and a fourth cuboid annotation that includes a yaw of the first cuboid annotation, a size of the cuboid annotation included in the training data, and a position of the cuboid annotation included in the training data; and determining an average of the first distance, the second distance, and the third distance;

processing point cloud data using the first ML model and a second ML model to generate cuboid annotations of objects in the point cloud data by performing steps including:

processing the point cloud data using the first ML model to determine cuboid tracks associated with the objects;

projecting regions of the point cloud data including the objects to a plurality of two-dimensional (2D) views; and processing the plurality of 2D views and the cuboid tracks using the second ML model to determine updated cuboid tracks associated with the objects;

determining a confidence threshold based on a count of the cuboid annotations;

determining, based on the confidence threshold, one or more of the cuboid annotations to be displayed; and causing to be displayed the one or more of the cuboid annotations based on the determining, and at least one user interface element that permits a user to select, confirm, or modify the one or more of the cuboid annotations that is displayed.

12. The computer-implemented method of claim 11, wherein the point cloud data is further processed to generate at least one of semantic segmentation annotations, partial segmentation annotations, or video annotations.

13. The computer-implemented method of claim 11, wherein the confidence threshold indicates a number of the cuboid annotations to display.

14. The computer-implemented method of claim 11, wherein the one or more of the cuboid annotations are determined based on an inverse of the confidence threshold.

15. The computer-implemented method of claim 11, wherein the confidence threshold is further determined based on a user selection from the user.

16. The computer-implemented method of claim 11, wherein at least one of the first ML model or the second ML model is trained to generate annotations associated with either dynamic objects or static objects.

17. A computer-implemented method for training a machine learning (ML) model, the method comprising:

receiving training data including point cloud data and a labeled cuboid bounding at least one object in the point cloud data; and training a ML model using a loss function that is evaluated
by performing steps including:
predicting, using the ML model, a cuboid annotation, each of the cuboid annotation and the labeled cuboid indicating features of the bounding of the at least one object, the features including a size, a position, and a yaw,
for each feature,
determining an additional cuboid annotation based on the feature of the cuboid annotation and remaining features of the labeled cuboid, and
determining a distance between the labeled cuboid and the additional cuboid annotation, and
determining an average of the distances between the labeled cuboid and the additional cuboid annotation determined for each feature.

\* \* \* \* \*